United States Patent
Miyazaki

(10) Patent No.: US 10,482,142 B2
(45) Date of Patent: Nov. 19, 2019

(54) INFORMATION PROCESSING DEVICE, INFORMATION PROCESSING METHOD, AND PROGRAM

(71) Applicant: SONY CORPORATION, Tokyo (JP)

(72) Inventor: Mitsuhiro Miyazaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 503 days.

(21) Appl. No.: 15/305,128

(22) PCT Filed: May 19, 2015

(86) PCT No.: PCT/JP2015/002515
§ 371 (c)(1),
(2) Date: Oct. 19, 2016

(87) PCT Pub. No.: WO2015/182064
PCT Pub. Date: Dec. 3, 2015

(65) Prior Publication Data
US 2017/0046440 A1   Feb. 16, 2017

(30) Foreign Application Priority Data

May 26, 2014   (JP) .................................. 2014-107710

(51) Int. Cl.
*G06F 16/9535*   (2019.01)
*G06F 16/435*   (2019.01)
(Continued)

(52) U.S. Cl.
CPC ........ *G06F 16/9535* (2019.01); *G06F 16/437* (2019.01); *G06F 16/9038* (2019.01); *H04L 67/42* (2013.01)

(58) Field of Classification Search
CPC ............. G06F 16/9535; G06F 16/9038; G06F 16/437; H04L 67/42
(Continued)

(56) References Cited

U.S. PATENT DOCUMENTS 7,801,885 B1 * 9/2010 Verma ................. G06F 16/9535
707/713
2009/0055385 A1 * 2/2009 Jeon .................... H04N 5/44543
(Continued)

FOREIGN PATENT DOCUMENTS

JP   2009-140075 A   6/2009

OTHER PUBLICATIONS

International Search Report dated Sep. 2, 2015 in PCT/JP2015/002515 filed May 19, 2015.

*Primary Examiner* — Dung K Chau
(74) *Attorney, Agent, or Firm* — Xsensus, LLP

(57) ABSTRACT

Systems, methods and devices to provide recommendation information. A server, server system or server-implemented method can comprise circuitry that collects pieces of information via the Internet, determines recommendation information from the collected pieces of information, and determines an information search degree associated with the recommendation information. Data regarding the recommendation information and data regarding the information search degree can be output to provide an indication of the recommendation information. An apparatus, system or method can control display of recommended information and can comprise or be implemented using circuitry that receives, from a source external to the apparatus or system, data regarding recommended information and data regarding a generated information search degree associated with the recommended information. The apparatus or system can control display of an indication of the recommended information based on the received data regarding the generated information search degree and the received data regarding the recommended information.

18 Claims, 10 Drawing Sheets

(51) Int. Cl.
*G06F 16/9038* (2019.01)
*H04L 29/06* (2006.01)

(58) Field of Classification Search
USPC ......... 707/722, 748, 736, 741, 745, 999.005
See application file for complete search history.

(56) References Cited

U.S. PATENT DOCUMENTS

| | | | |
|---|---|---|---|
| 2009/0144635 A1 | 6/2009 | Miyazaki et al. | |
| 2009/0319509 A1* | 12/2009 | Smeaton | G06F 16/3326 |
| 2010/0076968 A1* | 3/2010 | Boyns | H04W 4/21 |
| | | | 707/732 |
| 2010/0281012 A1* | 11/2010 | Imig | G06F 16/951 |
| | | | 707/708 |
| 2012/0084292 A1* | 4/2012 | Liang | G06F 16/2228 |
| | | | 707/741 |
| 2012/0317123 A1* | 12/2012 | Green | G06F 16/9535 |
| | | | 707/748 |
| 2013/0036344 A1* | 2/2013 | Ahmed | G06F 16/9535 |
| | | | 715/205 |
| 2014/0279196 A1* | 9/2014 | Wilson | G06Q 30/0631 |
| | | | 705/26.7 |
| 2014/0280226 A1* | 9/2014 | Wilson | G06N 3/063 |
| | | | 707/748 |

* cited by examiner

ND PROGRAM

TECHNICAL FIELD

The present technology relates to an information processing device, an information processing method, and a program, and for example, relates to an information processing device, an information processing method, and a program which are preferable when performing a recommendation of information, an object, or the like.

CROSS REFERENCE TO RELATED APPLICATIONS

This application claims the benefit of Japanese Priority Patent Application JP 2014-107710 filed May 26, 2014, the entire contents of which are incorporated herein by reference.

BACKGROUND ART

In the related art, a technology of performing a recommendation of contents based on a plurality of strategies which are planned based on a relationship with a short term interests, a long term preference, and knowledge of a user has been proposed (for example, refer to PTL1). The technology which is described in the PTL 1 can be applied to a recommendation of articles of news, or the like, for example.

CITATION LIST

Patent Literature

PTL 1: Japanese Unexamined Patent Application Publication No. 2009-140075

SUMMARY OF INVENTION

Technical Problem

Meanwhile, a user has various styles of reading articles. For example, there is a case in which a user reads an article related to various topics without being limited to a specific topic, and there is a case in which the user digs deep into an article related to a specific topic. However, when an article is recommended simply based on a preference of a user, it is not possible to correspond to such a difference in reading style, and as a result, there is a case in which it is difficult for a user to find a desired article.

The present technology has been made in consideration of such a situation, and allows a user to easily obtain desired information, or the like.

Solution to Problem

According to one or more embodiments of the present disclosure, a server or server system comprises circuitry configured to collect a plurality of pieces of information via the Internet, determine recommendation information from the collected pieces of information, determine an information search degree associated with the recommendation information, and output data regarding the recommendation information and data regarding the information search degree to provide an indication of the recommendation information. Additionally, one or more embodiments of the present disclosure can also include a method comprising collecting a plurality of pieces of information via the Internet, determining recommendation information from the collected pieces of information, determining an information search degree associated with the recommendation information, and outputting data regarding the recommendation information and data regarding the information search degree to provide an indication of the recommendation information.

Advantageous Effects of Invention

According to the embodiments of the present technology, a user easily obtains desired information, or the like.

In addition, the effect which is described here is not necessarily limited, and may be any one of effects which are described in the present disclosure.

DESCRIPTION OF EMBODIMENTS

Hereinafter, embodiments for embodying the present technology (hereinafter, referred to as embodiment) will be described. In addition, descriptions will be made in the following order.

<1. Embodiment>
<2. Modification example>
  <1. Embodiment>
  {Configuration Example of Information Processing System 1}

Figure 1:
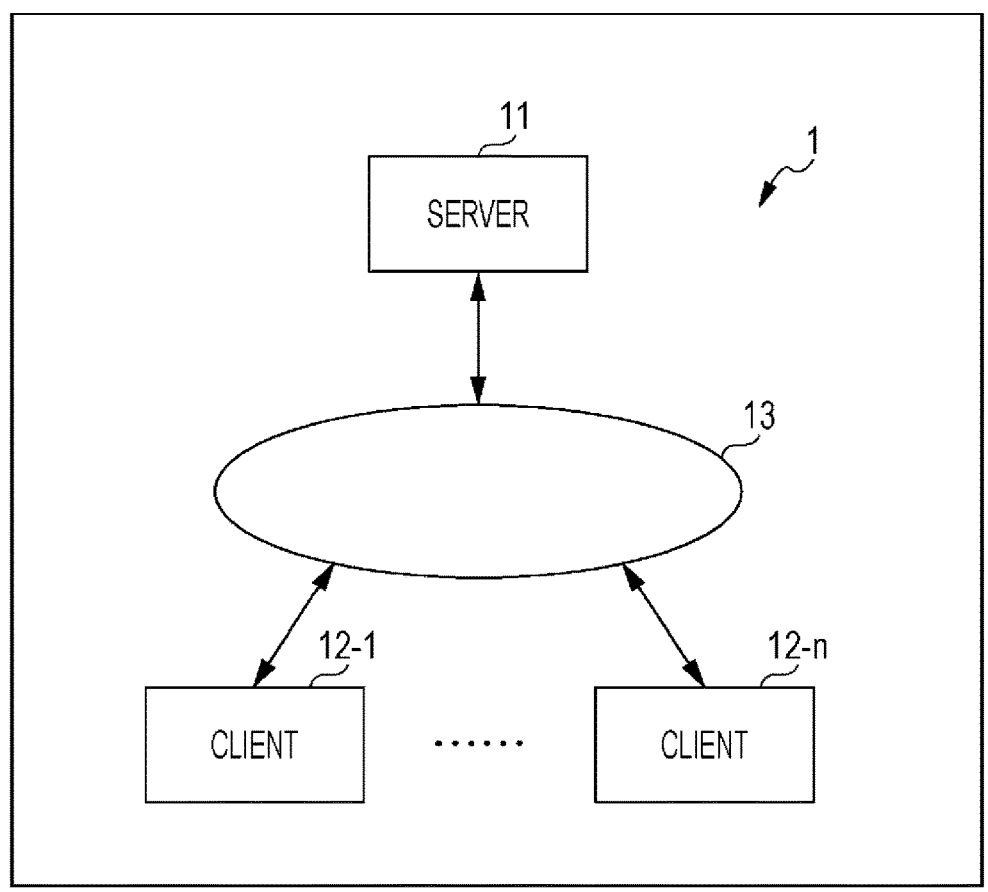
FIG. 1 is a block diagram which illustrates one embodiment of an information processing system to which the present technology is applied.

FIG. 1 illustrates one embodiment of a information processing system 1 to which the present technology is applied.

An information processing system 1 is configured so as to include a server 11, and clients 12-1 to 12-n. The server 11 and the clients 12-1 to 12-n are connected to each other through a network 13, and perform a communication with each other. It is possible to adopt an arbitrary communication method regardless of wired or wireless as a communication method of the sever 11 and the clients 12-1 to 12-n.

The server 11 provides a search-recommendation service which performs a search and a recommendation of various information, a thing, or the like, with respect to a user who uses the clients 12-1 to 12-n. In addition, the server 11 provides the clients 12-1 to 12-n with an application program which is necessary when using the search-recommendation service as necessary (hereinafter, referred to as search-recommendation service APP).

The clients 12-1 to 12-n are used, for example, when each user uses the search-recommendation service which is provided from the server 11. In addition, a form of embodying the clients 12-1 to 12-n does not matter when the clients are devices which are capable of using the search-recommendation service. For example, the clients 12-1 to 12-n are configured of a mobile information terminal such as a smart phone, a tablet, a mobile phone, a notebook personal computer, a desktop personal computer, a game machine, a motion picture reproducing device, a music reproducing device, or the like.

In addition, hereinafter, a case in which the server 11 performs a search and a recommendation of an article which includes text information such as news, a contribution to a social networking service (SNS), or the like, will be described as an example. In addition, information of a motion picture, an image, sound, or the like, other than the text information, may be included in the article which is searched for and recommended by the server 11.

In addition, hereinafter, when it is not necessary to classify the clients 12-1 to 12-n, individually, the clients are simply referred to as a client 12.

{Configuration Example of Functions of Server 11}

Figure 2:
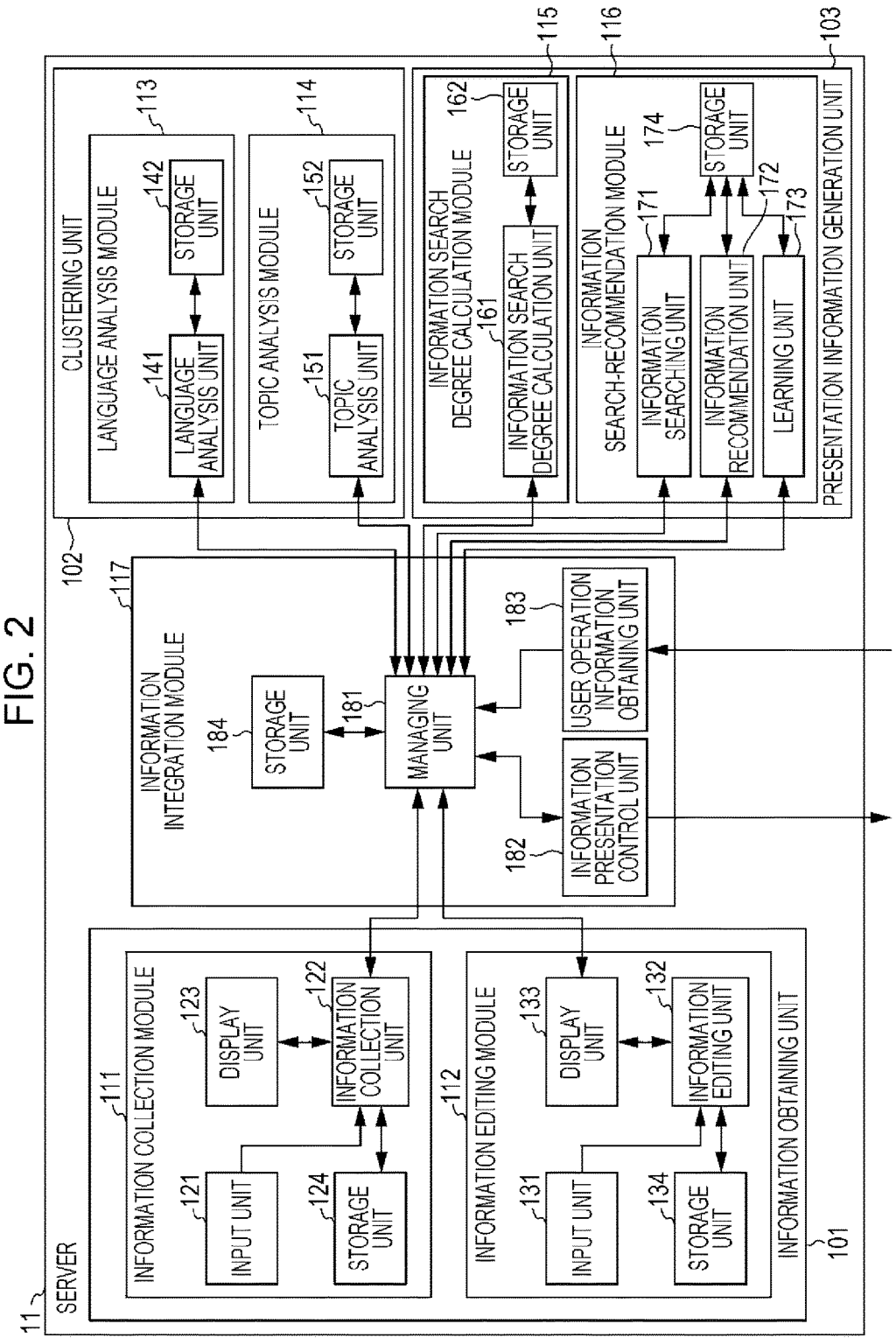
FIG. 2 is a block diagram which illustrates a configuration example of functions of a server.

FIG. 2 illustrates a configuration example of functions of the server 11. The server 11 is configured by including an information collection module 111, an information editing module 112, a language analyzing module 113, a topic analyzing module 114, a information search degree calculation unit 115, an information search-recommendation module 116, and an information integration module 117.

The information collection module 111 is configured by including an input unit 121, an information collection unit 122, a display unit 123, and a storage unit 124.

The input unit 121 is configured of various input devices such as a keyboard, a mouse, buttons, a switch, a microphone, and the like, for example. The input unit 121 is used when inputting an instruction with respect to the information collection module 111, data, or the like, for example, and supplies the input instruction, data, or the like, to the information collection unit 122.

The information collection unit 122 is configured of, for example, a processor and the like. The information collection unit 122 performs collecting of an article which will be presented to a user from a server (not illustrated) or the like, through the network 13, and supplies information on the collected article to a managing unit 181 of the information integration module 117.

The display unit 123 is configured of a display, or the like, for example, and performs a display of a screen, or the like, for using the information collection module 111.

The storage unit 124 is configured of a storage device, for example, and stores data, or the like, which is necessary in processing of the information collection unit 122.

The information editing module 112 is configured by including an input unit 131, an information editing unit 132, a display unit 133, and a storage unit 134.

The input unit 131 is configured of various input devices such as a keyboard, a mouse, buttons, a switch, a microphone, and the like, for example. The input unit 131 is used when inputting an instruction with respect to the information collection module 111, data, or the like, for example, and supplies the input instruction, data, or the like, to the information editing unit 132.

The information editing unit 132 is configured of a processor, or the like, for example. The information editing unit 132 obtains information related to the article which is collected by the information collection module 111 from the managing unit 181, and performs editing of the information. Here, editing of information includes, for example, excluding of a malicious article, an article on a website which has a problem in security, or the like, or selecting an article which will be preferentially recommended to a user. The information editing unit 132 supplies information denoting a result of information editing to the managing unit 181.

The display unit 133 is configured of a display, or the like, for example, and performs a display of a screen, or the like, for using the information editing module 112.

The storage unit 134 is configured of, for example, a storage device, and stores data, or the like, which is necessary in processing of the information editing unit 132.

In addition, the information obtaining unit 101 is configured by the information collection module 111 and the information editing module 112.

The language analysis module 113 is configured by including a language analysis unit 141 and a storage unit 142.

The language analysis unit 141 is configured of a processor, or the like, for example. The language analysis unit 141 obtains metadata of each article from the managing unit 181, and performs a language analysis of each article. The language analysis unit 141 supplies a result of the language analysis to the managing unit 181.

The storage unit 142 is configured of a storage device, for example, and stores data, or the like, which is necessary in processing of the language analysis unit 141.

The topic analysis module 114 is configured by including a topic analysis unit 151 and a storage unit 152.

The topic analysis unit 151 is configured of a processor, or the like, for example. The topic analysis unit 151 obtains a result of a language analysis of each article from the managing unit 181, and performs a topic analysis of each article based on a result of the language analysis. The topic analysis unit 151 supplies a result of the topic analysis of each article to the managing unit 181.

The storage unit 152 is configured of a storage device, for example, and stores data, or the like, which is necessary in processing of the topic analysis unit 151.

In addition, the clustering unit 102 is configured by the language analysis module 113 and the topic analysis module 114.

The information search degree calculation module 115 is configured by including a information search degree calculation unit 161 and a storage unit 162.

The information search degree calculation unit 161 is configured of a processor, or the like, for example. The information search degree calculation unit 161 obtains data denoting feedback contents with respect to each article of each user (hereinafter, referred to as user response data) from the managing unit 181, and performs totalization of a topic frequency in which a distribution of a topic to which an article provided with feedback from each user belongs is denoted. In addition, the information search degree calculation unit 161 calculates a degree of information search of each user based on a totalization result of the topic frequency. Here, the degree of information search is a value in which a tendency of information search of a user (distribution of article which is provided with feedback from user) is analyzed from a plurality of viewpoints, and it will be described in detail later. The information search degree calculation unit 161 supplies the totalization result of the topic frequency of each user, and a calculation result of the degree of information search to the managing unit 181.

The storage unit 162 is configured of a storage device, for example, and stores data, or the like, which is necessary in processing of the information search degree calculation unit 161.

The information search-recommendation module 116 is configured by including an information searching unit 171, an information recommendation unit 172, a learning unit 173, and a storage unit 174.

The information searching unit 171, the information recommendation unit 172, and the learning unit 173 are configured of a processor, or the like, for example.

The information searching unit 171 performs searching of an article which will be presented to each user. For example, the information searching unit 171 obtains searching conditions which are designated by a user, and information related to an article which is a target which will be presented to the user from the managing unit 181, and searches for an article which corresponds to the searching conditions. The information searching unit 171 supplies a searching result to the managing unit 181.

The information recommendation unit 172 selects an article which will be recommended to each user. For example, the information recommendation unit 172 obtains a totalization result of user response data and a topic frequency of each user, and information related to an article which is a target which will be presented to a user from the managing unit 181. In addition, the information recommendation unit 172 obtains a learning result of a preference of each user from the learning unit 173. In addition, the information recommendation unit 172 selects an article which will be recommended to each user based on obtained data, or the like. The information recommendation unit 172 supplies information which denotes an article which will be recommended to each user to the managing unit 181.

In this manner, a selection unit which selects an article which will be presented to a user is configured by the information searching unit 171 and the information recommendation unit 172.

The learning unit 173 performs learning of a preference of each user. For example, the learning unit 173 obtains user response data of each user, and results of a language analysis and a topic analysis of each article from the managing unit 181. The learning unit 173 learns a preference with respect to an article of each user based on obtained data, or the like. The learning unit 173 supplies a learned result of a preference of each user to the information recommendation unit 172 and the managing unit 181.

The storage unit 174 is configured of a storage device, for example, and stores data, or the like, which is necessary in processing of the information searching unit 171, the information recommendation unit 172, and the learning unit 173.

In addition, the presentation information generation unit 103 is configured by the information search degree calculation module 115 and the information search-recommendation module 116.

The information integration module 117 is configured by including the managing unit 181, an information presentation control unit 182, a user operation information obtaining unit 183, and a storage unit 184.

The managing unit 181, the information presentation control unit 182, and the user operation information obtaining unit 183 are configured by a processor, or the like, for example.

The managing unit 181 controls a process of each module, or controls a delivery and an acceptance of data between respective modules, for example. In addition, the managing unit 181 causes the storage unit 184 to store data, or the like, which is obtained from each module, the information presentation control unit 182, and the user operation information obtaining unit 183, or supplies the data, or the like, which is stored in the storage unit 184 to each module and the information presentation control unit 182.

The information presentation control unit 182 transmits data, or the like, for presenting an article to a user to each client 12 through the network 13, and controls a presentation of an article to each client 12.

The user operation information obtaining unit 183 receives user operation information which denotes operation contents with respect to a search-recommendation service of each user from each client 12 through the network 13. The user operation information obtaining unit 183 supplies the received user operation information to the managing unit 181.

The storage unit 184 is configured of a storage device, for example, and stores data, or the like, which is necessary in processing of the entire server 11.

{Configuration Example of Functions of Client 12}

Figure 3:
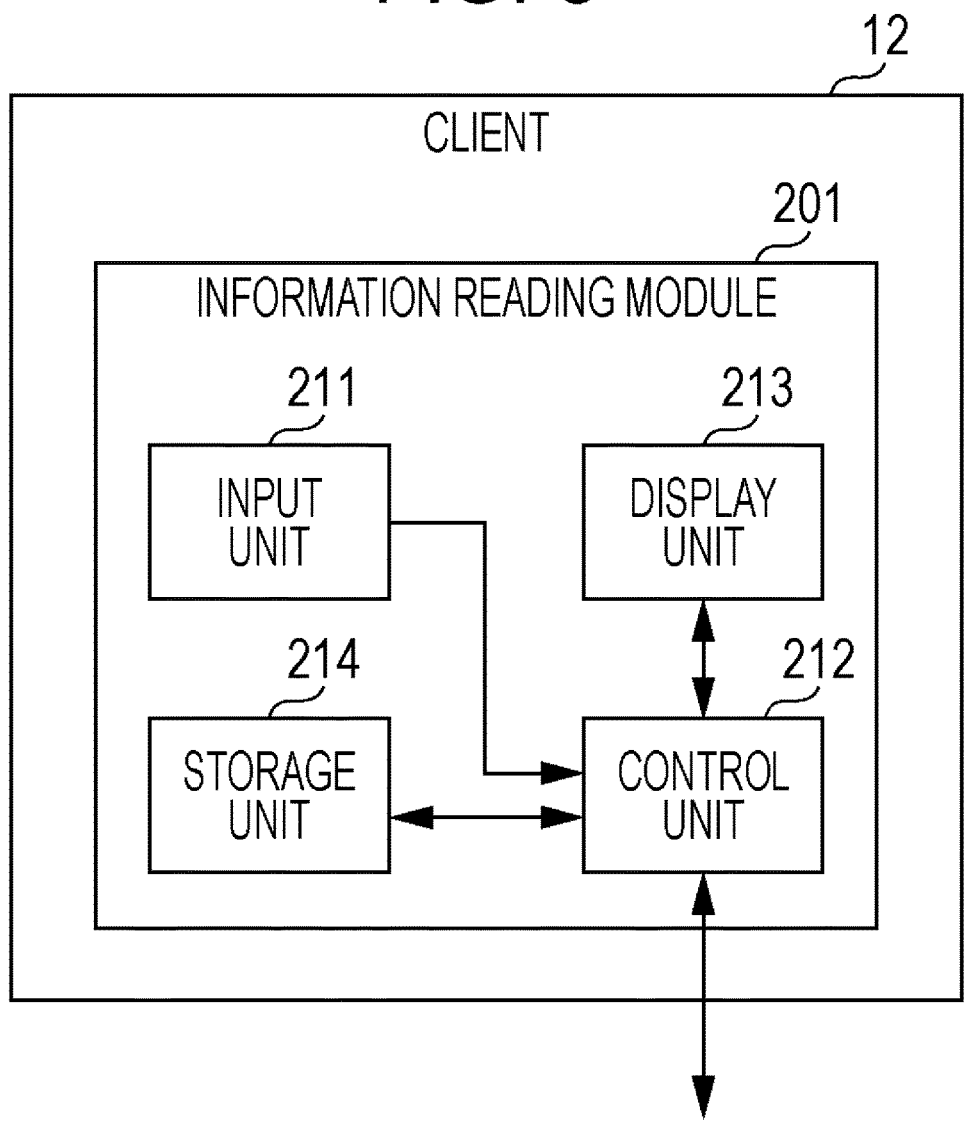
FIG. 3 is a block diagram which illustrates a configuration example of functions of a client.

FIG. 3 illustrates a configuration example of functions of the client 12. The client 12 is configured by including an information reading module 201.

The information reading module 201 is configured by including an input unit 211, a control unit 212, a display unit 213, and a storage unit 214.

The input unit 211 is configured by various input devices such as a keyboard, a mouse, buttons, a switch, a microphone, and the like, for example. The input unit 211 is used when inputting an instruction with respect to the information reading module 201, data, or the like, for example, and supplies the input instruction, data, or the like, to the control unit 212.

The control unit 212 is configured of a processor, or the like, for example. The control unit 212 controls a process of a search-recommendation service in the client 12. For example, the control unit 212 receives data which is transmitted from the server 11 through the network 13, and controls a presentation of an article to a user in the display unit 213 based on the received data, or the like. In addition, the control unit 212 transmits the user operation information which denotes contents of the user operation which is input by a user using the input unit 211 to the server 11 through the network 13.

The display unit 213 is configured of a display, or the like, for example, and performs a display of a screen, or the like, for using the information reading module 201.

The storage unit 214 is configured of a storage device, for example, and stores data, or the like, which is necessary in processing of the control unit 212.

{Process of Information Processing System 1}

Subsequently, processes of the information processing system 1 will be described with reference to FIGS. 4 to 9.

(Information Obtaining Process)

Figure 4:
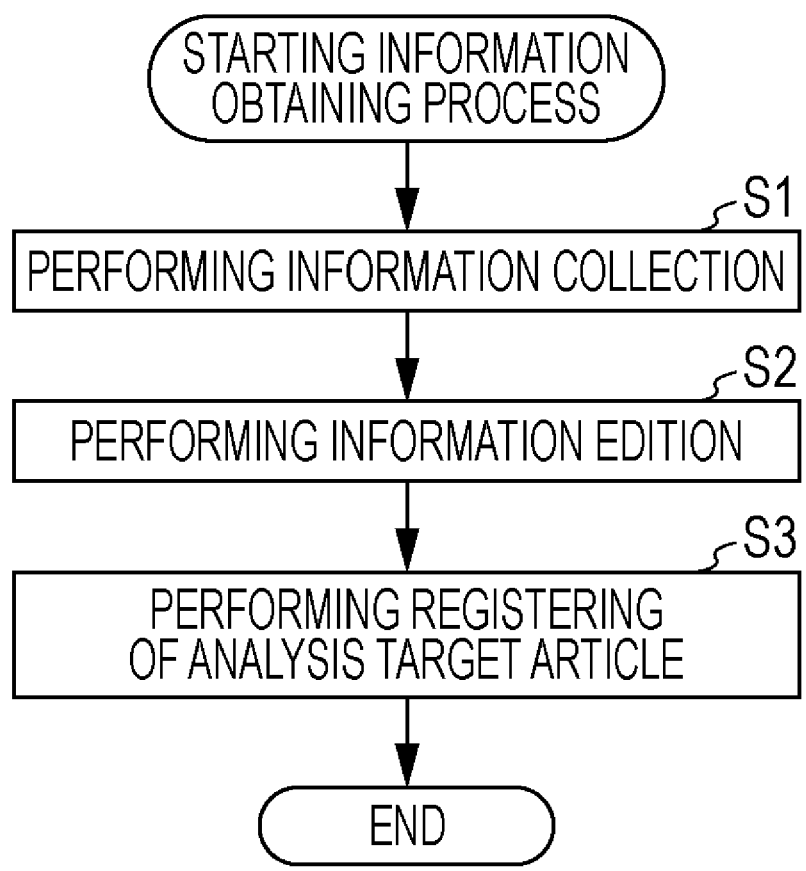
FIG. 4 is a flowchart which describes an information obtaining process.

First, an information obtaining process which is executed by the server 11 will be described with reference to the flowchart in FIG. 4. In addition, the process is executed on a regular basis such as once a day, once in an hour, or the like, for example. Alternatively, the process is executed due to an instruction from a manager of the search-recommendation service (hereinafter, referred to as service manager), for example.

In step S1, the server 11 performs information collection. For example, the information collection unit 122 of the information collection module 111 performs scrolling on a website which provides RSS information (hereinafter, referred to as RSS site) through the network 13. The information collection unit 122 supplies information related to a new article and an updated article (hereinafter, referred to as new-updated article information) of each RSS site which is obtained as a result of scrolling to the managing unit 181 of the information integration module 117. The managing unit 181 causes the storage unit 184 to store the obtained new and updated article information.

In addition, the new-updated article information includes metadata of each article. In addition, the metadata of each article includes, for example, a title of an article, the text of the article, a date and time of publication, a date and time of updating, a URL of a web page which is placing the article, a language which is used, or the like.

In step S2, the server 11 performs editing of information. Specifically, the managing unit 181 supplies new-updated article information which is obtained in the process in step S1 to the information editing unit 132 of the information editing module 112. The information editing unit 132 extracts a problem article among articles which are included in the new-updated article information, and registers the article on a blacklist. Here, the problem article is a vicious article, an article on a website with a problem in security, or the like.

In addition, a process of registering on the black list may be manually performed, or may be automatically executed using the information editing unit 132. In a case of the former, for example, a service manager selects an article which will be registered on the black list. In case of the latter, for example, the information editing unit 132 automatically selects an article which will be registered on the black list using a learning module, or the like.

In addition, the information editing unit 132, for example, selects an article which will be preferentially recommended to a user among articles which are included in the new-updated article information according to an instruction which is input by a service manager through the input unit 131, and registers the article in a pickup list.

The information editing unit 132 supplies a black list and a pickup list to the managing unit 181. The managing unit 181 causes the storage unit 184 to store the black list and the pickup list.

In step S3, the managing unit 181 of the information integration module 117 registers an analysis target article. Specifically, the managing unit 181 registers an article excluding the article which is registered on the black list among articles included in the new-updated article information as the analysis target article.

Thereafter, the information obtaining process ends.

(Information Analysis Process)

Figure 5:
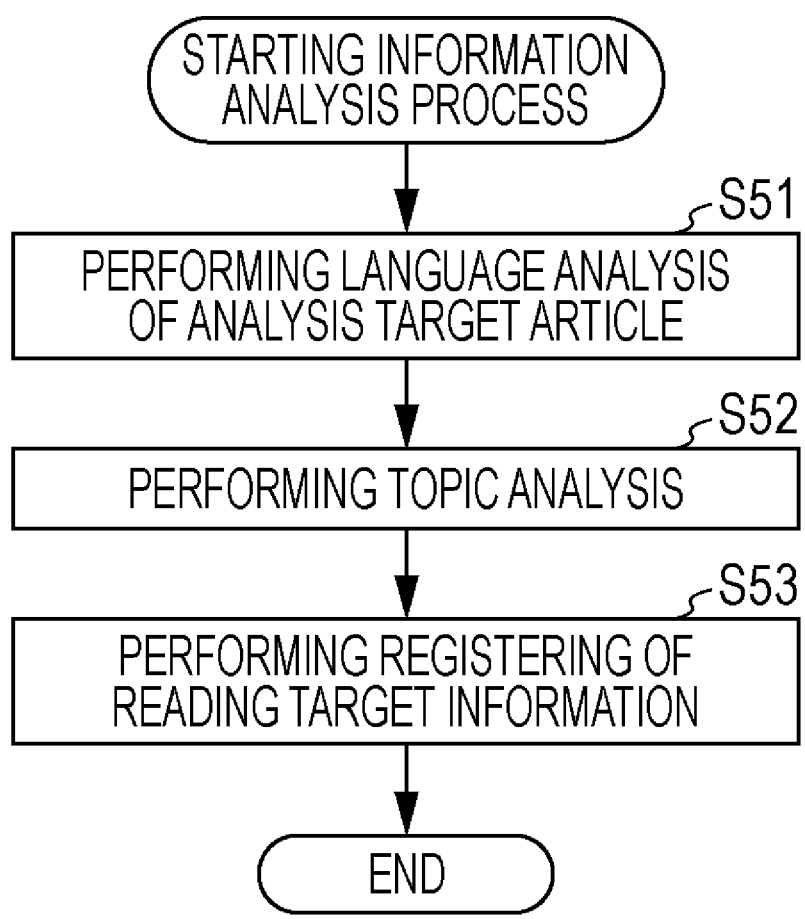
FIG. 5 is a flowchart which describes an information analysis process.

The information analysis process which is executed by the server 11 will be described with reference to the flowchart in FIG. 5. In addition, the process is executed, for example, on a regular basis such as once a day, once in an hour, or the like, for example. Alternatively, the process is executed after executing the above described information obtaining process with reference to FIG. 4. Alternatively, the process is executed due to an instruction from a service manager, for example.

In step S51, the server 11 performs a language analysis of the analysis target article. Specifically, the language analysis unit 141 of the language analysis module 113 obtains metadata of the analysis target article from the storage unit 184 through the managing unit 181. The language analysis unit 141 performs morphological analysis of a title and text of each analysis target article using a word dictionary which is stored in advance in the storage unit 142, and extracts words from the title and the text of each article.

In addition, hereinafter, the total number of words which are registered in the word dictionary is set to M, and each word is denoted as word $w_i$ (i=1, 2, ..., M). In addition, hereinafter, the total number of analysis target articles is set to N, and each article is denoted as article $d_j$ (j=1, 2, ..., N). In addition, hereinafter, when it is not necessary to individually classify word $w_i$, it is simply referred to as a word w or a word, and when it is not necessary to individually classify article $d_j$, it is simply referred to as article d or an article.

The language analysis unit 141 calculates $tf_{i,j}$ and $df_i$ with respect to each word $w_i$ registered in the word dictionary which is held in advance. Here, $tf_{i,j}$ is a frequency of appearance (the number of appearances) of word $w_i$ in article $d_j$, and $df_i$ denotes the number of articles d including word $w_i$.

In addition, the language analysis unit 141 calculates $tfidf_{ij}$ of each word $w_i$ in each article $d_j$ according to the following expression (1).

$$tdif_{ij} = tf_{ij} * \log(N/df_i) \qquad (1)$$

In addition, the language analysis unit 141 generates a word vector $W_j$ which is formed of weight of each word $w_i$ in each article $d_j$ according to the following expression (2).

$$W_j = \{tfidf_{1j}, tfidf_{2j}, \ldots, tfidf_{Mj}\} \qquad (2)$$

That is, the word vector $W_j$ is a feature vector which denotes a feature of each article $d_j$ based on weight of each word $w_i$.

The language analysis unit 141 supplies a language analysis result of the analysis target article to the managing unit 181, and the managing unit 181 causes the storage unit 184 to store the language analysis result of the analysis target article. In addition, the language analysis result of each analysis target article includes calculation results of $tf_{ij}$ and $tfidf_{ij}$ of each analysis target article, and the word vector $W_j$.

In step S52, the server 11 performs a topic analysis. Specifically, the managing unit 181 supplies the language analysis result of the analysis target article to the topic analysis unit 151 of the topic analysis module 114. The topic analysis unit 151 performs a topic analysis of the analysis target article using a stochastic topic model such as a Probabilistic Latent Semantic Analysis (PLSA) or a Latent Dirichlet Allocation (LDA), for example.

For example, the topic analysis unit 151 calculates attribute probability p ($z_k|d_j$), with respect to each topic $Z_k$ (k=1, 2, ..., K) of each article $d_j$, and occurrence probability p ($w_i|z_k$) of each word $w_i$ in each topic $Z_k$ by setting $tf_{ij}$ and $tfidf_{ij}$ which are language analysis results of the analysis target article, and the number of K of a topic (cluster) which is desired to be classified as inputs, and using PLSA which is denoted in the following expression (3).

$$p(w_i \mid d_j) = \sum_{k=1}^{K} p(w_i \mid z_k) p(z_k \mid d_j) \qquad (3)$$

In addition, $p(w_i|d_j)$ is occurrence probability of word $w_i$ in article $d_j$.

In addition, the topic analysis unit 151 generates a topic vector $T_j$ which is formed of the topic attribute probability $p(z_k|d_j)$ with respect to each topic $Z_k$ of each article $d_j$ according to the following expression (4).

$$T_j = \{p(z_1|d_j), p(z_2|d_j), \ldots, p(z_K|d_j)\} \qquad (4)$$

That is, the topic vector $T_j$ is a feature vector which denotes a feature of each article $d_j$ based on a probability which is attributed to each topic $z_k$.

The topic analysis unit 151 supplies a topic analysis result of the analysis target article to the managing unit 181, and the managing unit 181 causes the storage unit 184 to store the topic analysis result of the analysis target article. In addition, the topic analysis result of each analysis target article includes the word vector $W_j$ of each analysis target article.

In addition, PLSA is described in detail in "Thomas Hofmann, "Probabilistic latent semantic indexing", 1999, Proceedings of the $22^{nd}$ annual international ACM SIGIR conference on Research and development in information retrieval", or the like, and LDA is described in detail in "David M. Blei, Andrew Y. Ng, Michael I. Jordan, "Latent Dirichlet Allocation", 2003, Journal of Machine Learning Research, Volume 3", or the like.

In addition, hereinafter, when it is not necessary to individually classify topic $z_k$, it is simply referred to as topic z or a topic. In addition, hereinafter, when it is not necessary to individually classify the word vector $W_j$ and the topic vector $T_j$, these are simply referred to as a word vector W and a topic vector T. In addition, hereinafter, when it is not necessary to individually classify the topic attribute probability $p(z_k|d_j)$, it is simply referred to as topic attribute probability $p(z|d)$.

In step S53, the managing unit 181 of the information integration module 117 registers reading target information. Specifically, the managing unit 181 registers each analysis target article as reading target information along with metadata of each article, the word vector $W_j$, the topic vector $T_j$, and a topic with maximum attribute probability.

Here, the topic with maximum attribute probability is a topic of which topic attribute probability $p(z_k|d_j)$ of the article $d_j$ is maximum. For example, when classification number of a topic (hereinafter, referred to as total number of topics) K is 10, for example, and a value of a topic vector $T_1$ of an article $d_1$ is {0.2, 0.4, 0.8, 0.1, 0.3, 0.5, 0.1, 0.1, 0.3, 0.6}, the topic with maximum attribute probability of the article $d_1$ becomes topic $z_3$. That is, it is predicted that the article $d_1$ has the highest probability which is attributed to the topic $z_3$, and includes largest contents related to the topic $z_3$.

In addition, hitherto, an article which is registered in the reading target information is referred to as a reading target article.

Thereafter, the information analysis process ends.

(Information Presentation Process)

Figure 6:
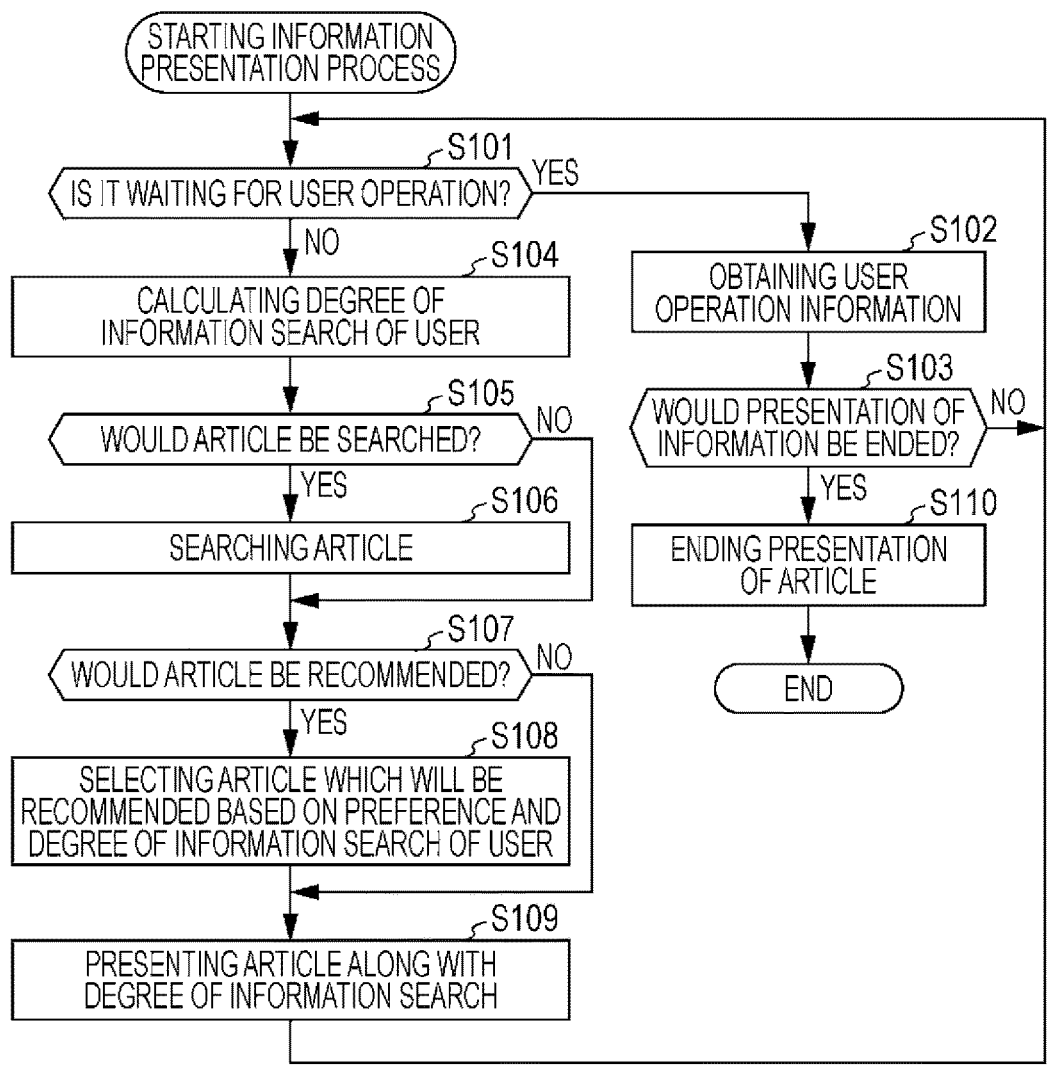
FIG. 6 is a flowchart which describes an information presentation process.

Subsequently, an information presentation process which is executed using the information processing system 1 will be described with reference to the flowchart in FIG. 6. In addition, the process is started, for example, when a user performs an operation (for example, start-up operation of search-recommendation service APP, or the like) for using the search-recommendation service which is provided from the server 11 using the input unit 211 of the client 12.

In step S101, the control unit 212 of the information reading module 201 of the client 12 determines whether or not to wait for a user operation. When the control unit 212 makes a determination to wait for the user operation, the process proceeds to step S102.

In step S102, the information processing system 1 obtains user operation information. Specifically, when a user performs an operation with respect to the search-recommendation service using the input unit 211 of the information reading module 201 of the client 12, the input unit 211 supplies information denoting contents of the user operation to the control unit 212.

Here, as an operation with respect to the search-recommendation service, for example, the following operation, is assumed. For example, an operation of starting or updating a display of a screen of the search-recommendation service, or an operation of ending the search-recommendation service is assumed. In addition, for example, operations of inputting a search query, setting a period (date) of searching an article, setting a language which is used in an article, and setting searching conditions of an article such as selecting of a RSS site which distributes an article are assumed. In addition, for example, inputting of feedback (for example, selection, evaluation, or the like, of a presented article) with respect to a presented article is assumed. In addition, for example, an operation of designating a way of receiving a recommendation of an article by selecting a degree of information search which is valued, that is, by giving priority to a degree of information search with any viewpoint of breadth, depth, newness, and popularity is assumed.

The control unit 212 generates user operation information which denotes operation contents of a user, and transmits the information to the server 11 through the network 13. The user operation information obtaining unit 183 of the information integration module 117 of the server 11 receives user operation information which is transmitted from the client 12, and supplies the information to the managing unit 181. The managing unit 181 supplies the obtained user operation information to each module as necessary. In addition, when feedback of a user with respect to a presented article is included in the obtained user operation information, the managing unit 181 causes the storage unit 184 to store the presented article and contents of the feedback as user response data by dividing the data into data items for each user.

In step S103, the control unit 212 of the client 12 determines whether or not a presentation of information ends. For example, when operation contents of a user which are obtained in the process in step S102 is not an operation of ending the search-recommendation service, the control unit 212 determines that the presentation of information is continued, and the process returns to step S101.

Thereafter, processes in steps S101 to S103 are repeatedly executed until it is determined not to wait for the user operation in step S101, or it is determined to end the presentation of information in step S103.

Meanwhile, in step S101, for example, when operation contents of the user which are obtained in the process in step S102 are an operation of starting or updating a display on a screen of the search-recommendation service, the control unit 212 of the client 12 determines not to wait for the operation of the user. Alternatively, for example, when it is a case in which starting and updating of the display on the screen of the search-recommendation service is performed without the operation of the user, the control unit 212 determines not to wait for the operation of the user. In addition, when the control unit 212 determines not to wait for the operation of the user, the process proceeds to step S104.

In step S104, the information search degree calculation unit 161 of the information search degree calculation module 115 of the server 11 calculates a degree of information search of a user. Specifically, the information search degree calculation unit 161 obtains user response data of a user in the past from the storage unit 184 through the managing unit 181. In addition, the information search degree calculation unit 161 performs totalization of an article to which a user performs positive feedback, in other words, of a topic frequency which denotes a distribution of a topic to which an article to which a user expresses a positive response belongs. For example, the information search degree calculation unit 161 totalizes the topic frequency by totalizing a topic with a maximum attribute probability of the article to which the user performs positive feedback. Accordingly, a value of a topic frequency of a topic to which the article to which the user expresses a positive response belongs becomes large.

Here, the article for which the user performs positive feedback is, for example, an article which is given a good evaluation from a user, an article that a user actually accessed with respect to a presented article, or the like.

In addition, hereinafter, the article for which the user performs positive feedback is referred to as an article with a positive response. In addition, hereinafter, an article for which the user performs negative feedback is referred to as an article with a negative response. In addition, the article for which the user performs negative feedback is, for example, an article which is given a bad evaluation from a user, or the like. In addition, hereinafter, the article for which the user performs feedback, either positive or negative, is referred to as an article with user response.

In addition, a totalizaion period of a topic frequency is set to an arbitrary period. For example, a totalizaion period of a topic frequency is set to a whole period in which a user used the search-recommendation service up to this point, or the previous predetermined period (for example, one day, one week, one month, one year, or the like). Alternatively, a totalizaion period of a topic frequency is set to a use period of the search-recommendation service in this time (for example, log-in period with respect to search-recommendation service in this time), for example.

In addition, for example, the topic frequency may be totalized by integrating a topic vector of an article for which a user performs positive feedback. In this case, a distribution of a topic to which the article for which a user performed positive feedback belongs is reflected on the topic frequency more accurately.

In addition, the information search degree calculation unit 161 calculates a degree of information search which denotes a tendency of an information search of a user from a plurality of viewpoints based on the totalized topic frequency.

In addition, hereinafter, a case in which a distribution of the topic frequency is $\{1, 7, 0, 3, 0, 1, 0, 0, 2, 1\}$, that is, a case in which a topic frequency of a topic $z_1$ is 1, a topic frequency of a topic $z_2$ is 7, . . . , and a topic frequency of a topic $z_{10}$ is 1 will be described. In addition, hereinafter, a case in which a topic with maximum attribute probability of an article for which a user previously performed positive feedback (hereinafter, referred to as topic with previous response) is a topic $z_2$ will be described.

For example, the information search degree calculation unit 161 calculates a degree of information search based on four viewpoints of "breadth", "depth", "newness", and "popularity".

The degree of information search (breadth) is a degree of information search using a viewpoint based on breadth of a topic range to which the article for which a user performs positive feedback belongs, in other words, a viewpoint based on breadth of types of the article for which a user performed positive feedback. For example, the degree of information search (breadth) is calculated using the following expression (5).

degree of information search (breath)=number of topics of which topic frequency is threshold value $TH1$ or more/total number of topics×100 (5)

For example, when the threshold value TH1 is set to 1, in an example of a topic frequency which is illustrated in advance, the number of topics of which a topic frequency is the threshold value TH1 or more is 6. In addition, since the number of total topics is 10, the degree of information search (breadth) becomes 60%.

The degree of information search (breadth) becomes large when a range of the topic to which the article for which a user performs positive feedback belongs becomes wide, and becomes small when the range of the topic to which the article for which the user performs positive feedback belongs becomes narrow. Accordingly, the degree of information search (breadth) becomes an index which denotes the extent of breadth in which the user is searching for information.

The degree of information search (depth) is a degree of information search using a viewpoint based on a distribution in each topic of an article for which a user performs positive feedback. For example, the degree of information search (depth) is calculated using the following expression (6).

degree of information search (depth)=topic frequency of topic with previous response/upper limit value×100 (6)

Here, the topic frequency of a topic with a previous response is a topic frequency of a topic with a maximum attribute probability of an article for which a user previously performs positive feedback. Accordingly, in the present example, since the topic frequency of the topic $z_2$ which is the topic with a previous response of a user is 7, when the upper limit value is set to 10, the degree of information search (depth) becomes 70%.

The degree of information search (depth) becomes large when the number of times of performing the positive feedback by a user with respect to an article which belongs to the topic with a previous response increases, and becomes small when the number of time of performing the positive feedback by a user with respect to the article which belongs to the topic with a previous response decreases. Accordingly, the degree of information search (depth) becomes an index which denotes what is the extent of depth in which the user is searching for information with respect to the topic with a previous response (for example, topic which belongs to article to which user pays attention at present).

In addition, a value of the upper limit value may be changed according to the total number of articles with a positive response. That is, the larger the total number of articles with a positive response, the larger the upper limit value may be set, and the smaller the total number of articles with a positive response, the smaller the upper limit value may be set.

In addition, the degree of information search (depth) may exceed 100%.

The degree of information search (newness) is a degree of information search using a viewpoint based on a distribution based on newness of an article for which a user performs positive feedback. For example, the degree of information search (newness) is calculated using the following expression (7).

degree of information search (newness)=number of new articles among articles with positive response/total number of articles with positive response (7)

For example, when an article which is added or updated in a predetermined period (for example, within the previous 6 hours) is defined as a new article, and a distribution of a topic frequency in which only a new article is set to a target is set to {0, 4, 0, 1, 0, 0, 0, 0, 1, 0}, the number of new articles among articles with a positive response is 6. In addition, since the total number of articles with a positive response is 15, the degree of information search (newness) becomes 40%.

The degree of information search (newness) becomes large when the number of time of performing a positive feedback by a user with respect to a new article increases, and becomes small when the number of time of performing the positive feedback by a user with respect to the new article decreases. Accordingly, the degree of information search (newness) becomes an index which denotes what is the extent of newness in which the user is searching for new information.

The degree of information search (popularity) is a degree of information search using a viewpoint based on a distribution based on popularity of an article for which a user performs positive feedback. For example, the degree of information search (popularity) is calculated using the following expression (8).

degree of information search (popularity)=number of popular articles among articles with positive response/total number of articles with positive response     (8)

For example, an article with a score of popularity which is a predetermined threshold value or more is defined as a popular article, and when a distribution of a topic frequency in which only a popular article is set to a target is set to {0, 2, 0, 0, 0, 0, 0, 0, 1, 0}, the number of popular articles among articles with a positive response becomes 3. In addition, since the total number of articles with a positive response is 15, the degree of information search (popularity) becomes 20%.

In addition, the score of popularity of an article is calculated based on, for example, the number of times of access to an article, the number of users who give a good evaluation to the article, or the like. For example, when the number of times of access of all users to a certain article A is set to p times, and the number of times of access of all users to all of articles is set to p times, a score of popularity of the article A is calculated using p/P×100.

The degree of information search (popularity) becomes large when the number of times of performing a positive feedback with respect to a popular article increases, and becomes small when the number of time of performing the positive feedback with respect to the popular article decreases. Accordingly, the degree of information search (popularity) becomes an index which denotes what is the extent of popularity in which the user is searching for popular information (for example, information which becomes a topic, and which attracts attention).

In addition, for example, the popular article may be filtered using demographic information of a user such as an area, gender, age, and an occupation. For example, when a user is a man in his 30s who lives in Yokohama, only an article of which a score of popularity is a threshold value or more among men in 30s who live in Yokohama may be set to a popular article.

In addition, the information search degree calculation unit 161 calculates a general search degree based on a degree of information search in each viewpoint using the following expression (9).

general search degree=(degree of information search (breadth)+degree of information search (depth)+ degree of information search (newness)+degree of information search (popularity))/4     (9)

That is, the general search degree is a mean value of information search degrees in each viewpoint.

The information search degree calculation unit 161 supplies the totalization result of the topic frequency of a user, and the calculation results of the degree of information search and the general search degree to the managing unit 181. The managing unit 181 causes the storage unit 184 to store the totalization result of the topic frequency of the user, and the calculation results of the degree of information search and the general search degree.

In step S105, the information searching unit 171 of the information search-recommendation module 116 of the server 11 determines whether or not to search for an article. When it is determined to search an article, the process proceeds to step S106.

In step S106, the information searching unit 171 searches for an article. Specifically, the information searching unit 171 obtains reading target information from the storage unit 184 through the managing unit 181. In addition, the information searching unit 171 searches for an article which corresponds to searching conditions which are designated by a user from among reading target articles. The information searching unit 171 supplies a searching result to the managing unit 181.

In addition, hereinafter, the article which is searched for in the process in step S106 is referred to as a searched article.

Thereafter, the process proceeds to step S107.

Meanwhile, when it is determined not to perform searching in step S105, the process in step S106 is skipped, and the process proceeds to step S107.

In step S107, the information recommendation unit 172 of the information search-recommendation module 116 of the server 11 determines whether or not to recommend an article. When it is determined to recommend an article, the process proceeds to step S108.

In step S108, the information search-recommendation module 116 of the server 11 selects an article which will be recommended based on a preference and a degree of information search of a user. Specifically, the learning unit 173 of the information search-recommendation module 116 obtains reading target information and user response data from the storage unit 184 through the managing unit 181.

The learning unit 173, for example, generates a word preference vector and a topic preference vector of a user based on a word vector and a topic vector of an article for which a user performs positive feedback (article with user response). For example, the learning unit 173 generates the word preference vector by adding a word vector of the article with a user response. Similarly, the learning unit 173, for example, generates the topic preference vector by adding a topic vector of the article with a user response. The learning unit 173 supplies the word preference vector and the topic preference vector to the information recommendation unit 172.

Here, the learning unit 173 may add a word vector and a topic vector of a response article of each user by weighting thereof, according to a type of response of a user. For example, the learning unit 173 performs different weighting depending on a user response which is either positive or negative, and performs different weighting depending on whether a user actually accesses the article, or whether the user gives a good evaluation.

In addition, for example, the learning unit 173 may generate a word preference vector and a topic preference vector based only on a word vector and a topic vector of an article for which a user performs positive feedback (article with positive response).

In addition, a period for a feedback target of a user which is used when generating the word preference vector and the topic preference vector is set to an arbitrary period. For example, the learning unit 173 uses feedback of a user in a whole period in which the user uses the search-recommendation service up to this point, or uses feedback of the user in previous predetermined time (for example, one day, one week, one month, one year, or the like).

In addition, the information recommendation unit 172 obtains a totalization result of a topic frequency of a user, user response data, and reading target information from the storage unit 184 through the managing unit 181. The information recommendation unit 172 calculates a score of recommendation with respect to each reading target article based on at least one of a degree of similarity between a word preference vector of a user and a word vector of each reading target article, and a degree of similarity between a topic preference vector of a user and a topic preference vector of each reading target article. In addition, the degree of similarity between vectors is calculated using, for example, a cosine distance, or the like. In addition, the higher the degree of similarity between vectors, the larger the score of recommendation. In addition, the information recommendation unit 172 selects a predetermined number of articles of which a score of recommendation is high as an article which is recommended based on a preference of a user (hereinafter, referred to as preferentially recommended article).

In addition, the information recommendation unit 172 selects an article which will be recommended to a user from among the preferentially recommended articles based on the viewpoint of degree of information search (breadth) (hereinafter, referred to as article recommended based on breadth). For example, the information recommendation unit 172 selects an article in which a topic of which a topic frequency of a user is less than a predetermined threshold value (for example, topic frequency is 0) and a topic with a maximum attribute probability match with each other as the article recommended based on breadth. In this manner, for example, an article which belongs to a topic to which an article for which a user rarely performs positive feedback up to this point (for example, topic to which article for which user rarely access belongs) belongs, and an article which suits a preference of a user is selected as the article recommended based on breadth.

In addition, the information recommendation unit 172 selects an article which will be recommended to a user from among preferentially recommended articles based on a viewpoint of the degree of information search (depth) (hereinafter, referred to as article recommended based on depth). For example, the information recommendation unit 172 selects an article in which a topic with a maximum attribute probability matches the article for which a user previously performs positive feedback as the article recommended based on depth. In this manner, for example, an article which belongs to the same topic as that of the article for which the user previously performs positive feedback, and suits the preference of a user is selected as the article recommended based on depth.

In addition, the information recommendation unit 172 may select the article recommended based on depth based on predetermined q articles for which a user previously performs positive feedback. For example, the information recommendation unit 172 may select an article in which a topic of which a topic attribute probability p(z|d) becomes the maximum in a vector after being added with topic vectors of q articles matches a topic with a maximum attribute probability as the article recommended based on depth among the preferentially recommended articles.

In addition, for example, it is also possible for the information recommendation unit 172 to select an article in which a topic of which a topic frequency of a user is predetermined threshold value or more matches a topic with the maximum attribute probability as the article recommended based on depth among the preferentially recommended articles. In addition, for example, it is possible for the information recommendation unit 172 to select an article in which a topic of which a topic frequency of a user is maximum matches the topic with the maximum attribute probability as the article recommended based on depth among preferentially recommended articles.

In addition, the information recommendation unit 172 selects an article which will be recommended to a user from among preferentially recommended articles based on a viewpoint of the degree of information search (newness) (hereinafter, referred to as article recommended based on newness). For example, the information recommendation unit 172 selects a new article from among the preferentially recommended articles as the article recommended based on newness. In this manner, for example, a new article which suits the preference of a user is selected as the article recommended based on newness.

In addition, the information recommendation unit 172 selects an article which will be recommended to a user from among preferentially recommended articles based on a viewpoint of the degree of information search (popularity) (hereinafter, referred to as article recommended based on popularity). For example, the information recommendation unit 172 selects a popular article from among the preferentially recommended articles as the article recommended based on popularity. In this manner, for example, a popular article which suits the preference of a user is selected as the article recommended based on popularity.

The information recommendation unit 172 supplies information which denotes selection results of the preferentially recommended article, the article recommended based on breadth, the article recommended based on depth, the article recommended based on newness, and the article recommended based on popularity to the managing unit 181.

In addition, hereinafter, an article selected as an article which will be recommended to a user in a process in step S108 will be generically referred to as an article to be recommended. That is, the article to be recommended includes the preferentially recommended article, the article recommended based on breadth, the article recommended based on depth, the article recommended based on newness, and the article recommended based on popularity.

Thereafter, the process proceeds to step S109.

Meanwhile, in step S107, when it is determined not to recommend an article, the process in step S108 is skipped, and the process proceeds to step S109.

In step S109, the information processing system 1 presents an article along with a degree of information search. Specifically, the managing unit 181 obtains metadata of an article which will be presented to a user, that is, metadata of a searched article and an article to be recommended from the storage unit 184. In addition, the managing unit 181 supplies metadata of the searched article and the article to be recommended, information denoting a search result of the searched article, information denoting a selection result of the article to be recommended, and calculation results of the degree of information search and the general search degree of a user to the information presentation control unit 182.

The information presentation control unit 182 generates information presentation control data which is used when displaying a screen for presenting the searched article, the article to be recommended, and the degree of information search and the general search degree to a user. In addition, the information presentation control unit 182 transmits the information presentation control data to the client 12 through the network 13.

The control unit 212 of the information reading module 201 of the client 12 receives the information presentation control data from the server 11. The control unit 212 causes the display unit 213 to display a screen for presenting the searched article, the article to be recommended, and the degree of information search based on the information presentation control data.

Figure 7:
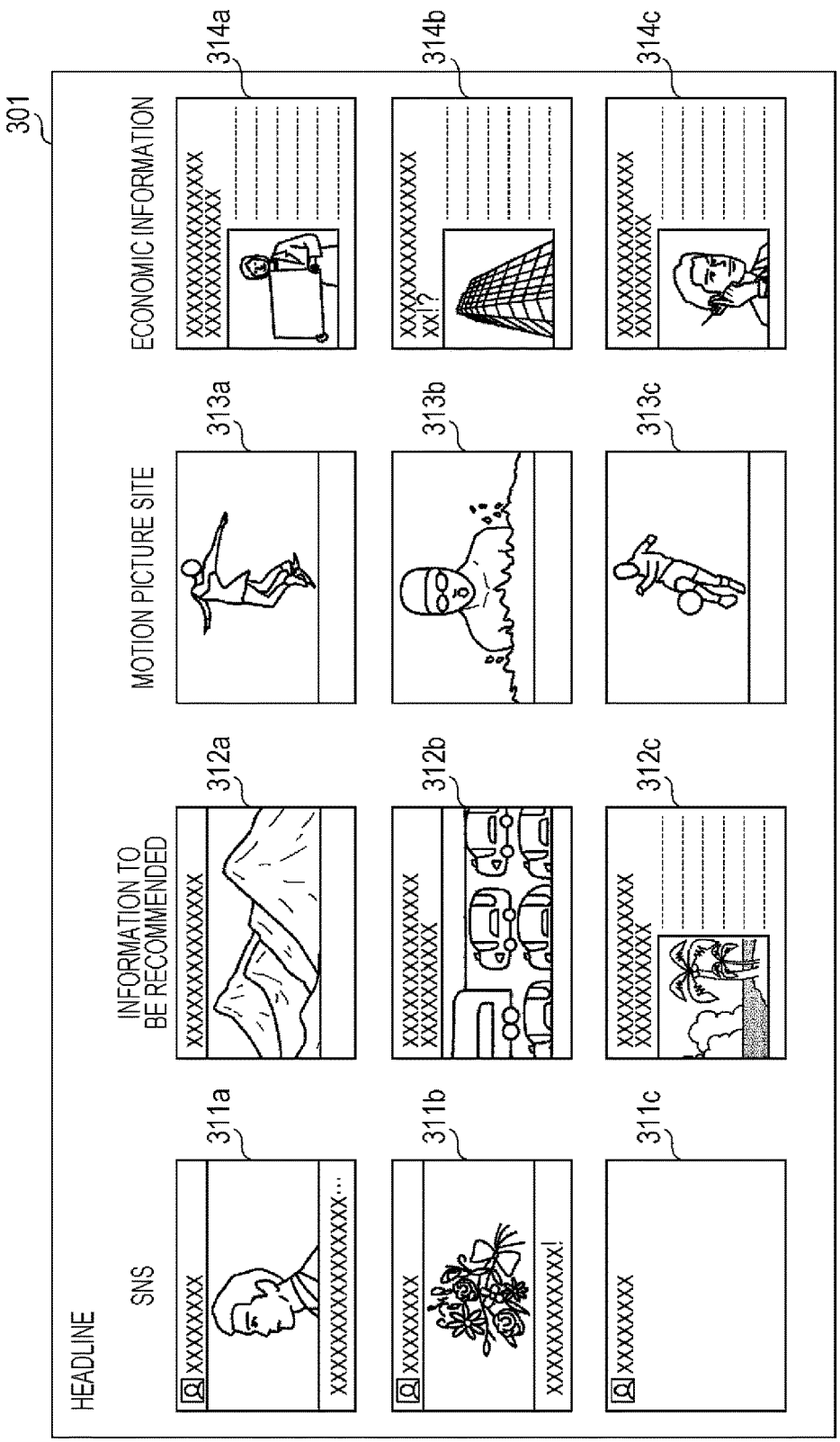
FIG. 7 is a diagram which illustrates a first example of a screen which is presented in a client.
Figure 8:
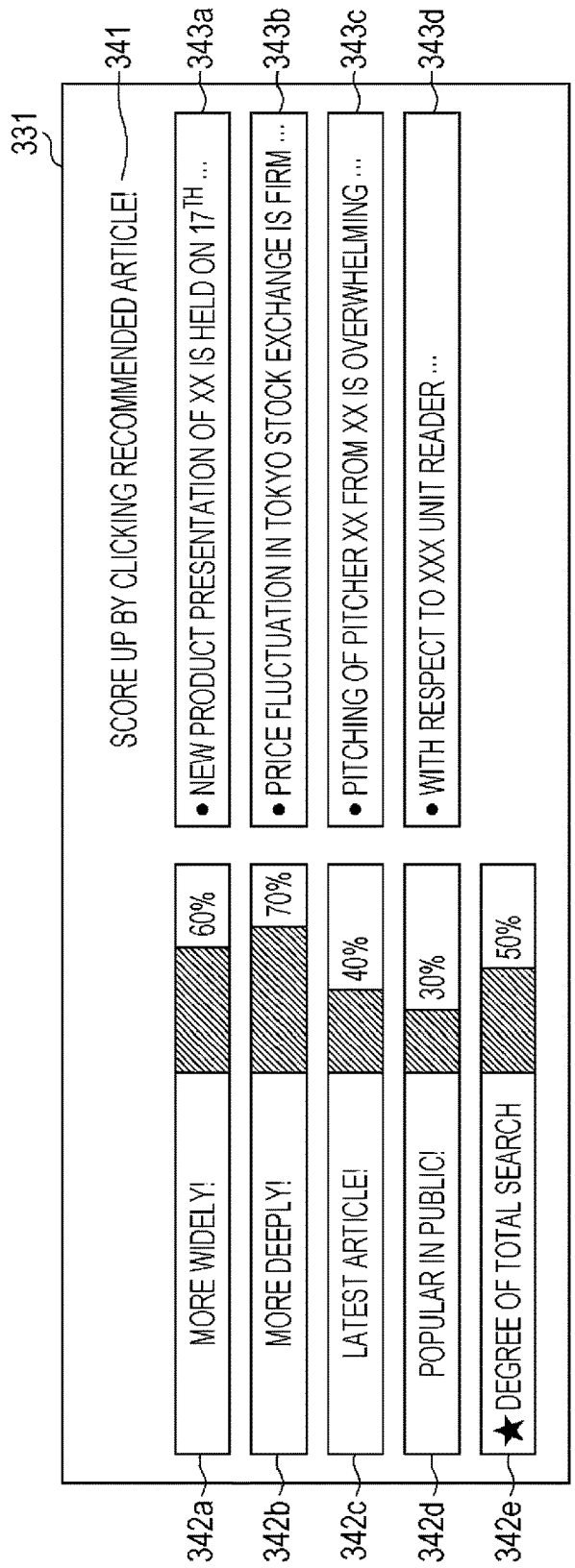
FIG. 8 is a diagram which illustrates a second example of a screen which is presented in a client.

A screen 301 in FIG. 7, and a screen 331 in FIG. 8 illustrate examples of screens which are displayed on the display unit 213 at this time. In addition, the screens 301 and 331 may be displayed in a line, or in an overlapping manner in one screen, and displays thereof may be switched using a predetermined operation by being set as separate screens.

The screen 301 in FIG. 7 is an example of a screen for presenting user a searched article and an article to be recommended. For example, articles which are provided from a predetermined social networking service (SNS) among searched articles are presented using thumbnails 311*a* to 311*c*. In addition, for example, preferentially recommended articles are presented using thumbnails 312*a* to 312*c*. In addition, for example, articles (including motion pictures) which are provided from a predetermined motion picture site among the searched articles are presented using thumbnails 313*a* to 313*c*. In addition, articles which belong to a specific topic (economy, in case of this example) among searched articles are presented using thumbnails 314*a* to 314*c*.

In addition, when there is an article which is set so as to be preferentially recommended to a user among the searched articles or the preferentially recommended articles, the article is preferentially presented. In addition, for example, when a degree of information search which is valued by a user is selected, an article which is searched based on the selected degree of information search is preferentially presented. For example, when it is set such that a user values the degree of information search (breadth), and when the article recommended based on breath is included in the searched article and the preferentially recommended article, the article is preferentially presented.

In addition, for example, it is possible for a user to cause the display unit 213 to display a web page where an article corresponding to a clicked thumbnail is placed by clicking any one of the thumbnails 311*a* to 314*c*, by operating the input unit 211.

The screen 331 in FIG. 8 is an example of a screen for presenting a user a degree of information search and a general search degree of a user, and a searched article based on the degree of information search. Specifically, a guidance display unit 341, a search degree display units 342*a* to 342*e*, and recommended information display units 343*a* to 343*d* are arranged in the screen 331. More specifically, the guidance display unit 341 is arranged on the higher right side of the screen 331. The recommended information display units 343*a* to 343*d* are arranged so as to align in the vertical direction under the guidance display unit 341. The search degree display units 342*a* to 342*d* are arranged so as to align on the left side of the recommended information display units 343*a* to 343*d*, respectively. In addition, the search degree display units 342*e* are arranged under the search degree display units 342*d*.

In the guidance display unit 341, a message which prompts an increase in degree of information search which is displayed on the left side of an article, by clicking the article in the recommended information display units 343*a* to 343*d*, and selection thereof is displayed.

A graph which denotes a degree of information search (breadth) of a user is displayed on the right side in the search degree display unit 342*a*. In the example, the degree of information search (breadth) of the user is 60%. A message which denotes that an article in the recommended information display unit 343*a* is an article for widening an information search range of a user is displayed on the left side in the search degree display unit 342*a*.

A part of an article, or a headline which is capable of increasing the degree of information search (breadth), is displayed in the recommended information display unit 343*a*. Specifically, the article in the recommended information display unit 343*a* is selected from among the above described articles recommended based on breadth. For example, an article with a highest recommendation score is selected among the articles recommended based on breadth. Alternatively, when there is an article which is set so as to be preferentially recommended to a user in the articles recommended based on breadth, for example, the article is selected.

A graph which denotes a degree of information search (depth) of a user is displayed on the right side in the search degree display unit 342*b*. In the example, the degree of information search (depth) of the user is 70%. In addition, a message which denotes that an article in the recommended information display unit 343*b* is an article for deepening an information search of a user is displayed on the left side in the search degree display unit 342*b*.

A part of article, or a headline which is capable of increasing the degree of information search (depth), is displayed in the recommended information display unit 343*b*. Specifically, the article which is displayed in the recommended information display unit 343*b* is selected from among the above described articles recommended based on depth. For example, an article with a highest recommendation score is selected among the articles recommended based on depth. Alternatively, when there is an article which is set so as to be preferentially recommended to a user in the articles recommended based on depth, for example, the article is selected.

A graph which denotes a degree of information search (newness) of a user is displayed on the right side in the search degree display unit 342*c*. In the example, the degree of information search (newness) of the user is 40%. In addition, a message which denotes that an article in the recommended information display unit 343*c* is a new article is displayed on the left side in the search degree display unit 342*c*.

A part of article, or a headline which is capable of increasing the degree of information search (newness), is displayed in the recommended information display unit 343*c*. Specifically, the article which is displayed in the recommended information display unit 343*c* is selected from among the above described articles recommended based on newness. For example, an article with a highest recommendation score is selected among the articles recommended based on newness. Alternatively, when there is an article which is set so as to be preferentially recommended to a user in the articles recommended based on newness, for example, the article is selected.

A graph which denotes a degree of information search (popularity) of a user is displayed on the right side in the search degree display unit 342d. In the example, the degree of information search (popularity) of the user is 30%. In addition, a message which denotes that an article in the recommended information display unit 343d is a popularity article is displayed on the left side in the search degree display unit 342d.

A part of article, or a headline which is capable of increasing the degree of information search (popularity), is displayed in the recommended information display unit 343d. Specifically, the article which is displayed in the recommended information display unit 343d is selected from among the above described articles recommended based on popularity. For example, an article with a highest recommendation score is selected among the articles recommended based on popularity. Alternatively, when there is an article which is set so as to be preferentially recommended to a user in the articles recommended based on popularity, for example, the article is selected.

A graph which denotes a value of a general search degree of a user is displayed in the search degree display unit 342e. In the example, the general search degree of the user is 50%.

In this manner, in the screen 331, since a recommended article is individually presented in each viewpoint of a degree of information search, it is possible for a user to easily select a recommended article based on each viewpoint. In addition, a user is able to easily understand comprehensiveness or diversity in his own information search. For example, a user is able to know how widely he is searching for information using an objective numerical value based on the degree of information search (breadth). In addition, the user is able to know how deeply he is searching for information using an objective numerical value based on the degree of information search (depth). In addition, the user is able to know to what extent he is searching for new information using an objective numerical value based on the degree of information search (newness). In addition, the user is able to know to what extent he is searching for popular information using an objective numerical value based on the degree of information search (popularity).

Thereafter, the process returns to step S101, and processes in steps S101 to S109 are repeatedly executed until it is determined that a presentation of information has ended in step S103. In addition, for example, a screen which presents a searched article or a recommended article is updated, or a web page where an article which is selected by a user is placed is displayed according to a user operation, or the like.

Figure 9:
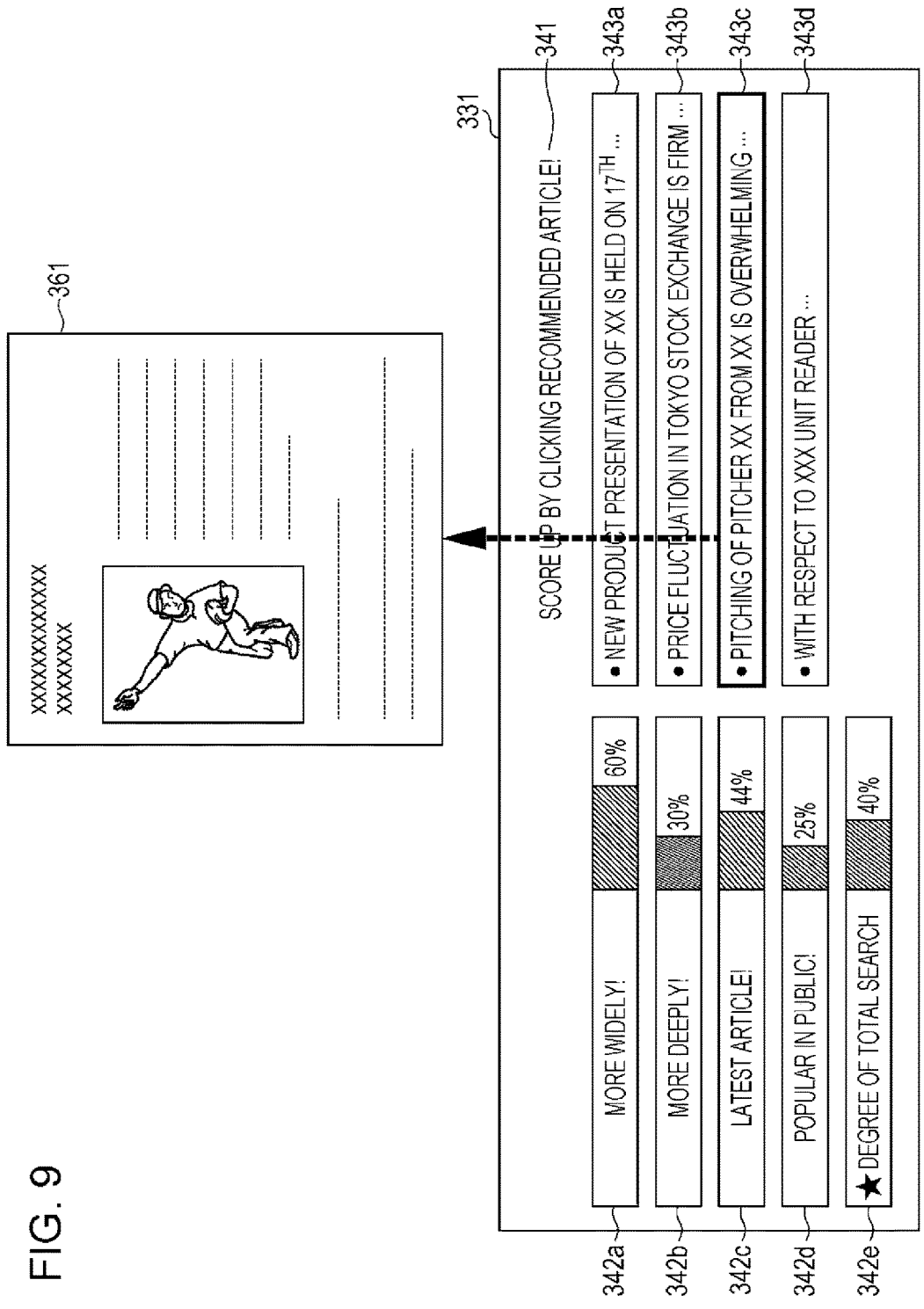
FIG. 9 is a diagram which illustrates a third example of a screen which is presented in a client.

For example, as illustrated in FIG. 9, when a user clicks the recommended information display unit 343c of the screen 331 using the input unit 211, a screen 361 for presenting a web page where the article in the recommended information display unit 343c is actually placed is displayed. The screen 361 may be displayed on the screen 331 in an overlapping manner, for example, and may be displayed side by side with the screen 331.

In addition, values of each degree of information search in the search degree display units 342a to 342e in the screen 331 and general search degree are changed by clicking the recommended information display unit 343c. For example, when a topic with a maximum attribute probability of an article in the recommended information display unit 343c is $z_9$, the article is a new article, and is not a popularity article, the degree of information search (breadth) is still 60%. Meanwhile, the degree of information search (depth) is changed to 30%, the degree of information search (newness) is changed to 43.75% (however, it is displayed as 44% in FIG. 9), and the degree of information search (popularity) is changed to 25%. In addition, the general search degree is changed to 39.9375% (however, it is displayed as being 40% in FIG. 9).

Meanwhile, in step S103, the control unit 212 of the client 12 determines that a presentation of information is ended, and the process proceeds to step S110 when contents of an operation of a user which is obtained in the process in step S102 is an operation for ending the search-recommendation service.

In step S110, the client 12 ends a presentation of information. For example, the control unit 212 of the client 12 ends a display of the search-recommendation service. Alternatively, the control unit 212 ends the execution of the search-recommendation service APP.

Thereafter, the information presentation process ends.

As described above, since an article is recommended in a different viewpoint based on a degree of information search, it is easy for a user to find a desired article. In addition, it is possible for a user to easily widen a range of an interesting article, easily deepen the interesting article of his own, or to have easy access to a new article which is unknown or a popular article. Accordingly, it is possible for a user to obtain desired information or information with a high level of satisfaction effectively and ease. In addition, it is also possible for a user to easily obtain desired information or information with a high level of satisfaction even when the user performs unfocused clicking, or the like, not only when the user performs definitely focused searching using a search query, or the like. In addition, it is possible to avoid a recommendation of redundant articles by performing a recommendation of an article based on a degree of information search.

In addition, it is possible for a user to objectively recognize comprehensiveness or diversity in information search of his own based on the degree of information search. In this manner, for example, it is possible for a user to objectively determine whether or not an information search behavior of his own is good enough, satisfying, or the like. In addition, for example, there is an effect of preventing an Internet addiction, or the like, of spending time idly in zapping, or the like, when a user is satisfied with his own information search behavior.

In addition, the clustering unit 102 appropriately classifies articles by classifying a topic of each article using a stochastic topic model, without using a prior knowledge. In this manner, since a prior knowledge such as a thesaurus, for example, is not necessary, it is possible to execute a classification of articles in which characteristics of the latest vocabulary or a phrase which is widely used on the Internet are simply and rapidly reflected. In addition, it is possible to classify dynamic articles in which a meaningful connection is reflected.

<2. Modification Example>

Hereinafter, modification examples of the above described embodiment according to the present technology will be described.

{Modification Example Related to Topic Analysis}

For example, it is possible to classify each article into two or more types based on subjectivity (hereinafter, referred to as subjectivity type) using a method of subjective determination which is disclosed in Japanese Unexamined Patent Application Publication No. 2010-272004 (hereinafter, referred to as Patent Document 2), or a journal of "Opinion Mining from Web documents: Extraction and Structurization" Vol. 22, No. 2, March 2007, pp. 227-238, by N. Kobayashi, etc. from the Japanese Society of Artificial Intelligence (hereinafter, referred to as Non-Patent Document 1). For example, it is possible to classify each article into two types of articles of a subjective article and an objective (neutral) article. In addition, the subjective article is classified into a positive article and a negative article.

Here, the subjective article is an article including a subjective expression (for example, thought, opinion, feelings, or the like), for example, and corresponds to a written opinion in Patent Document 2. On the other hand, the objective article is an article including only an objective fact, not including a subjective expression, and corresponds to a non-written opinion in Patent Document 2. In addition, the positive article is an article including a positive expression, for example. On the other hand, the negative article is an article including a negative expression, for example.

In this manner, each article is classified into three subjectivity types of a positive article, a negative article, and an objective article using the method of subjective determination. In addition, for example, the number of topics with which each article is classified becomes substantially three times, by performing a topic analysis on each subjectivity type, after classifying each article into three subjectivity types of a positive article, a negative article, and an objective article using the method of subjective determination.

For example, the topic analysis unit 151 classifies an article into three subjectivity types of a positive article, a negative article, and an objective article, first. In addition, the topic analysis unit 151 performs a topic analysis using the above described method with respect to a group of a positive article. In this manner, in the group of the positive article, K topics are generated, and an attribute probability p(z|d) with respect to each topic of each article is calculated. Similarly, in a group of a negative article, K topics are generated, and an attribute probability p(z|d) with respect to each topic of each article is calculated. In addition, in a group of an objective article, K topics are generated, and an attribute probability p(z|d) with respect to each topic of each article is calculated.

In this manner, each article is classified into three subjectivity types of a positive article, a negative article, and an objective article, and a classification of a topic of each article is performed in each subjectivity type. In this manner, the server 11 is capable of presenting an article by classification thereof into each subjectivity type, or recommending the article.

For example, the information presentation control unit 182 of the server 11 is capable of individually presenting a positive article, a negative article, and an objective article in line with respect to an article which belongs to the same topic (for example, article related to the same topic). In this manner, for example, it is possible for a user to read only an interesting article of a subjectivity type by selecting thereof, or to compare an article of a different subjectivity type with respect to a certain topic.

In addition, for example, the information presentation control unit 182 is capable of individually presenting three types of a positive article, a negative article, and an objective article in line in each viewpoint of a degree of information search. For example, the information presentation control unit 182 is capable of causing the recommended information display unit 343*a* of FIG. 8 to display three types of an article recommended based on breadth which is positive, an article recommended based on breadth which is negative, and an article recommended based on breadth which is objective in line, and to select one of these individually.

Here, the articles which are displayed in line in the recommended information display unit 343*a* may be articles related to the same topic, and may be articles related to different topics. For example, in case of the former, articles of subjectivity types which are different from each other such as a positive article, a negative article, and an objective article related to the same product are presented at the same time with respect to the same topic. On the other hand, in case of the latter, for example, articles of subjectivity types which are different from each other such as a positive article related to baseball, a negative article related to soccer, and an objective article related to science are presented at the same time with respect to different topics.

In addition, for example, the information presentation control unit 182 is capable of causing a user to designate an article of a subjectivity type which will be presented, in each viewpoint of a degree of information search. For example, the information presentation control unit 182 is capable of causing an article recommended based on breadth of a subjectivity type which is designated by a user to be displayed in the recommended information display unit 343*a*, by displaying buttons, or the like, for the user to designate the subjectivity type in the vicinity or inside of the recommended information display unit 343*a* in FIG. 8.

In this manner, it is possible for a user to read only an interesting article of a subjectivity type by selecting thereof, read articles of different subjectivity types, or compare the articles with each other, from each article which is recommended according to each viewpoint of a degree of information search.

In addition, for example, it is also possible for the information presentation control unit 182 to specify to which subjectivity type each article belongs, when presenting each article. In this manner, a user is able to know to which types of a positive article, a negative article, and an objective article, or a neutral article an article belongs, before reading contents of the article.

In addition, for example, the information recommendation unit 172 of the server 11 is capable of recommending an article while being balanced so that a subjectivity type is balanced. For example, the information recommendation unit 172 is capable of switching subjectivity types of an article to be recommended in order, or randomly, when recommending a group of articles which is related to an article for which a user performs positive feedback.

In addition, for example, the information recommendation unit 172 is capable of preferentially recommending an article of a subjectivity type which is designated by a user. For example, the information recommendation unit 172 is capable of preferentially recommending an article of a subjectivity type which is designated by a user (for example, positive article) when recommending a group of articles which is related to an article for which a user performs positive feedback. In addition, for example, the information recommendation unit 172 is capable of preferentially recommending an article of a subjectivity type which is designated by a user (for example, positive article) as an article which is recommended based on each viewpoint of the degree of information search which is displayed in the recommended information display units 343*a* to 343*d* in FIG. 8.

In addition, for example, it is possible to add a degree of information search (fairness) based on a distribution, based on a subjectivity type of an article for which a user performs positive feedback. That is, the degree of information search (fairness) becomes large when there is small deviation in the number of articles between respective subjectivity types, and becomes small when there is large deviation in the number of articles between respective subjectivity types, when classifying the articles for which a user performs positive feedback into each subjectivity type. Accordingly, when a user performs positive feedback equally with respect to a positive article, a negative article, and an objective article, the degree of information search (fairness) becomes large. On the other hand, when the article for which a user performed positive feedback is biased toward any one or two of the positive article, the negative article, and the objective article, the degree of information search (fairness) becomes small.

In addition, for example, the information recommendation unit 172 may select an article which will be recommended based on a viewpoint of the degree of information search (fairness). For example, the information recommendation unit 172 may preferentially recommend an article of a subjectivity type with the small number of feedback, when the article for which a user performs positive feedback (article with positive response) is biased toward any one or two of the positive article, the negative article, and the objective article. For example, when the article which gets a positive response from a user is biased toward a negative article, the information recommendation unit 172 may preferentially recommend a positive article or an objective article to the user.

In addition, the above described process may be performed by classifying each article into two subjectivity types of a positive article and a negative article, or two subjectivity types of a subjective article and an objective article. Alternatively, the positive article may be further subdivided based on a degree of positive property, or the negative article may be further subdivided based on a degree of negative property. In addition, for example, an article may be classified based on a subjective expression other than the positive property and the negative property.

{Modification Example Related to Method of Recommendation}

In the above descriptions, an example in which a recommended article based on each viewpoint of a degree of information search is selected from among articles which a user likes (article recommended based on preference) has been described; however, the recommended article may be selected from among articles other than the article recommended based on a preference.

In addition, in the screen 331 in FIG. 8, an example in which recommended articles are individually presented by being aligned in each viewpoint of a degree of information search has been described; however, for example, a user may designate a desired viewpoint, and a recommended article based on the viewpoint which is designated by the user may be presented.

{Modification Example Related to Learning of Preference}

In addition, the learning unit 173 of server 11 is capable of learning a preference of a user in each viewpoint of a degree of information search, by performing a recommendation of an article in each viewpoint of the degree of information search, for example, as displayed on the screen 331 in FIG. 8.

For example, the learning unit 173 is capable of learning a preference of a user with respect to an article which is recommended based on the degree of information search (breadth), by performing learning based only on the article for which the user performs positive feedback, with respect to the article which is recommended based on the degree of information search (breadth). Similarly, the learning unit 173 is capable of respectively learning preferences of the user with respect to articles which are recommended based on the degree of information preference (depth), the degree of information preference (newness), and the degree of information preference (popularity).

In this manner, for example, the information recommendation unit 172 is capable of recommending articles using different trends, using learning results which are different in each viewpoint of the degree of information preference. For example, the information recommendation unit 172 is capable of changing trends of topics to which a recommended article belongs in a case in which the article is recommended based on an information preference (breadth), and in a case in which the article is recommended based on an information preference (depth). In this manner, for example, even in a case in which trends of articles to be accessed are different in a case in which a user broadens knowledge, and in a case in which knowledge is deepened, an appropriate article is recommended according to the trend.

In addition, for example, the learning unit 173 is capable of learning a preference of a user with respect to each viewpoint of the degree of information search, by totalizing the number of times in which positive feedback is performed with respect to the article which is recommended based on each viewpoint of the degree of information search. In this manner, for example, the learning unit 173 is capable of classifying users into a type of collecting information broadly, a type of deepening knowledge, a type of checking the latest information, a type of following a trend, or the like. In addition, for example, the information recommendation unit 172 is capable of recommending an article which further matches a preference of a user, by recommending an article using a viewpoint of a degree of information search which the user likes more, preferentially when recommending an article to a user.

In addition, for example, the learning unit 173 is capable of learning a preference of a user by subdividing thereof, by combining a degree of information search and context information such as time, a place, or the like. For example, the learning unit 173 is capable of learning a preference of a user with respect to an article which is recommended based on the degree of information search (breadth) by classifying the preference using a place, time, or the like. In addition, for example, the information recommendation unit 172 is capable of changing trends of articles which are recommended based on the degree of information search (breadth), in a case in which a user is in a workplace, and in a case in which the user is at home, based on a learning result.

In addition, for example, the learning unit 173 is capable of learning a preference with respect to each viewpoint of the degree of information search by classifying the preference using a place, a time, or the like. In addition, for example, the information recommendation unit 172 is capable of switching viewpoints of a degree of information search which are preferentially used in recommendation, in a case in which a user is in a workplace, and in a case in which the user is at home, based on the learning result.

{Modification Example Related to Totalizing Method of Topic Frequency}

In addition, in the above descriptions, the information search degree calculation unit 161 totalizes a topic frequency by setting only an article for which a user performs positive feedback to a target; however, an article for which a user performs negative feedback may also be included in the target. That is, the information search degree calculation unit 161 may totalize topic frequencies by setting all of articles for which a user performs feedback to a target, in other words, by setting all of articles for which the user expresses a response to a target. Alternatively, for example, the information search degree calculation unit 161 may perform totalizing of topic frequencies by setting only the article for which a user performs feedback with predetermined contents as a target.

In addition, the information search degree calculation unit 161 may perform weighting addition according to contents of feedback when totalizing topic frequencies, for example. For example, the information search degree calculation unit 161 may perform different weighting depending on whether a user actually accesses an article or whether the user gives a good evaluation. In addition, for example, the information search degree calculation unit 161 may add a topic frequency when a user performs positive feedback, and may subtract a topic frequency when a user performs negative feedback.

{Modification Example Related to Presentation Method}

In addition, in the present technology, it is possible to adopt a device of an arbitrary type in the device which is used when presenting information such as articles. For example, it is possible to adopt various display devices of a display type, a projection type, or the like. In addition, it is possible to adopt various wearable devices such as a glasses type, a wrist-watch type, a bracelet type, a necklace type, a neckband type, an earphone type, a headset type, and a head-mount type, for example.

In addition, in a method of selecting a desired article by a user, it is also possible to adopt an arbitrary method such as a touching operation according to a type of a device, not only the above described clicking.

In addition, as a device which is used when presenting information such as an article, for example, it is possible to adopt a device which transmits auditory information such as sound, not only a device which transmits visual information such as an image. For example, when a wearable device of a neckband type, a headset type, or the like, which transmits auditory information, is adopted, it is possible to transmit a headline, or the like, of an article which is recommended based on a degree of information search to a user using a voice. In addition, in this case, it is possible for a user to select a desired article using a voice recognition technology. For example, when a user inputs a voice command such as "more widely", "dig deeply", "the latest news is . . . ", and "popular topic is . . . ", it is possible to select an article which is recommended based on each viewpoint of the degree of information search.

In addition, for example, it is also possible to cause another device to present a transmitted article by transmitting the article to another device (for example, mobile information terminal, wearable device, or the like) from the client 12, not only presenting an article in the client 12.

{Modification Example Related to Presentation Target}

In addition, in the above descriptions, an example in which a presentation target presented to a user is set to an article has been described; however, even in a case in which various information items other than an article are set to a presentation target, it is possible to apply the present technology when it is possible to classify the presentation target into a plurality of clusters. For example, according to the present technology, it is also possible to set information other than a motion picture, an image, sound, or the like, (hereinafter, referred to as non-text information) to a presentation target, not only text information such as an article.

Here, when the non-text information is set to a presentation target, for example, the clustering unit 102 is capable of classifying each non-text information into a plurality of clusters using the above described potential topic model, based on text information related to the non-text information. In this case, for example, clustering is performed based on text information which is included in metadata of non-text information (for example, title, artist, performer, genre, generated place, generated date and time, or the like), and text information included in a review article, a written description of one's impressions, an article, or the like, which is related to the non-text information.

In addition, for example, the clustering unit 102 is capable of classifying non-text information into a plurality of clusters based on an attribute of non-text information, or a feature amount (for example, feature amount of motion picture, image, sound, or the like) of the non-text information of its own. For example, the clustering unit 102 is capable of classifying music data into a plurality of clusters (for example, genre) based on a feature amount of the music data.

In addition, according to the present technology, for example, it is also possible to set goods, an action, a place, a person, or the like, to a presentation target other than information. In addition, clustering is performed with respect to a presentation target other than information based on text information related to the presentation target, or a feature amount of the presentation target of its own, as described above.

In addition, in the present technology, it is also possible to adopt an arbitrary clustering method other than the above described potential topic model. In addition, for example, the clustering method which is adopted in the present technology may be a hierarchical method or a non-hierarchical method. In addition, for example, the clustering method which is adopted in the present technology may be a soft clustering method or a hard clustering method. Alternatively, a person may perform clustering of a presentation target manually.

{Modification Example Related to Sharing of Functions, or the Like}

The above described sharing of functions between the server 11 and the client 12 is an example, and is arbitrarily changed. For example, the information search degree calculation module 115 and the information search-recommendation module 116 may be provided in the client 12.

In addition, for example, it is also possible to appropriately integrate or separate each module. For example, it is possible to appropriately share the input unit, the display unit, and the storage unit of the plurality of modules.

{Configuration Example of Computer}

It is possible to execute the above described series of processes using hardware or software. When the series of processes is executed using software, a program which configures the software is installed to a computer. Here, the computer includes a computer which is incorporated in exclusive hardware, a general purpose personal computer, for example, which is capable of executing various functions by being installed with various programs, or the like.

Figure 10:
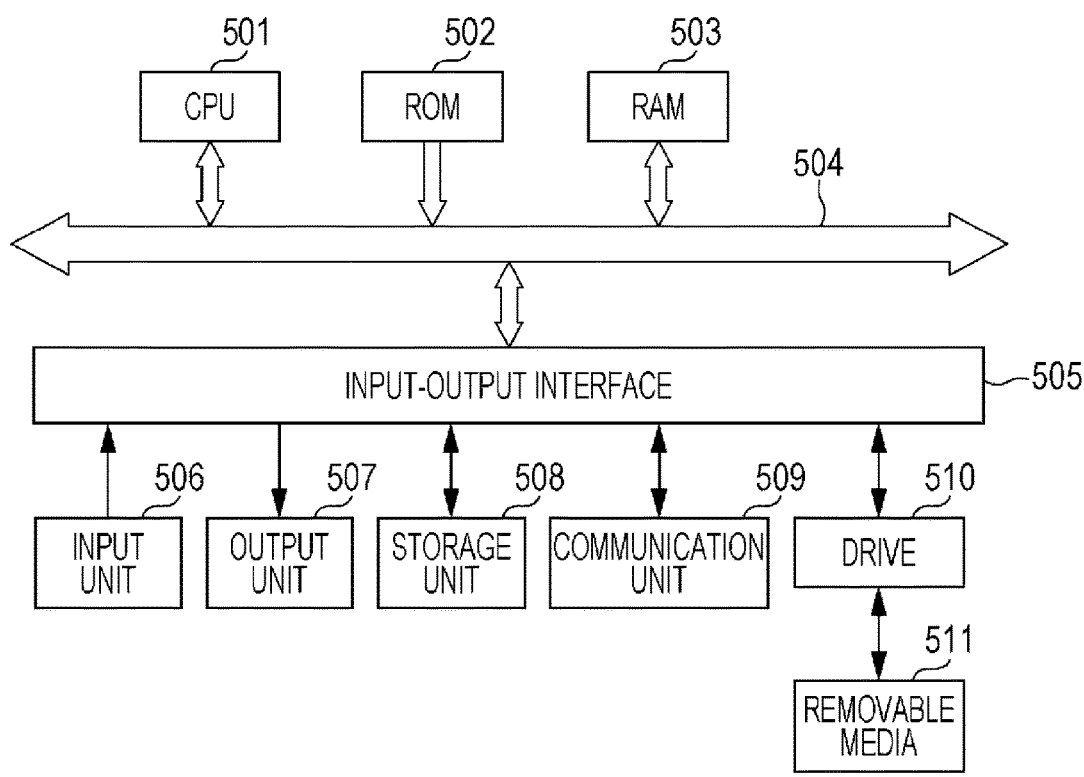
FIG. 10 is a block diagram which illustrates a configuration example of a computer.

FIG. 10 is a block diagram which illustrates a configuration example of hardware of a computer which executes the above described series of processes using a program.

In the computer, a Central Processing Unit (CPU) 501, a Read Only Memory (ROM) 502, and a Random Access Memory (RAM) 503 are connected to each other using a bus 504.

An input-output interface 505 is further connected to the bus 504. An input unit 506, an output unit 507, a storage unit 508, a communication unit 509, and a drive 510 are connected to the input-output interface 505.

The input unit 506 is formed of a keyboard, a mouse, a microphone, and the like. The output unit 507 is formed of a display, a speaker, and the like. The storage unit 508 is formed of a hard disk, a volatile memory, or the like. The communication unit 509 is formed of a network interface or the like. The drive 510 drives a removable media 511 such as a magnetic disk, an optical disc, a magneto-optical disc, or a semiconductor memory.

In the computer which is configured as described above, the CPU 501 performs above described series of processes when a program which is stored in the storage unit 508 is executed by being downloaded to the RAM 503 through the input-output interface 505 and the bus 504.

The program which is executed by the computer (CPU) 501 is provided by being recorded in the removable media 511 as a package media, or the like. In addition, the program is provided through a wired or wireless transmission media such as a local area network, the Internet, and digital satellite broadcasting.

In the computer, the program is installed in the storage unit 508 through the input-output interface 505 when the removable media 511 is mounted on the drive 510. In addition, the program is received in the communication unit 509 through a wired or wireless transmission medium, and is installed in the storage unit 508. In addition, the program is installed in the ROM 502 or the storage unit 508 in advance.

In addition, the program which is executed by the computer may be a program which is processed in time sequence in the order which is described in the specification, is processed in parallel, or is processed at a necessary timing when a call is made with respect to the program, or the like.

In addition, in the specification, the system means an assembly of a plurality of constituent elements (device, module (components), or the like), and whether or not all of the constituent elements are in the same housing does not matter. Accordingly, the system includes both a plurality of devices which are accommodated in different housings and are connected through a network, and one device in which a plurality of modules are accommodated in one housing.

In addition, the embodiment according to the present technology is not limited to the above described embodiment, and various changes thereof are possible without departing from the scope of the present technology.

For example, the present technology is capable of adopting a configuration of cloud computing in which one function is shared by a plurality of devices, and is jointly processed.

In addition, each step which is described in the above described flowchart is executed by being shared in a plurality of devices, not only being executed in one device.

In addition, when a plurality of processes are included in one step, the plurality of processes which are included in the one step is executed by being shared in a plurality of devices, not only being executed in one device.

In addition, the effect which is described in the specification is merely an example, is not limited, and may be another effect.

In addition, for example, the present technology is also capable of adopting the following configurations.

(1) One or more embodiments of the present disclosure include a server comprising: circuitry configured to collect a plurality of pieces of information via the Internet, determine recommendation information from the collected pieces of information, determine an information search degree associated with the recommendation information, and output data regarding the recommendation information and data regarding the information search degree to provide an indication of the recommendation information.

(2) The server according to (1), wherein the determined information search degree denotes a tendency of an information search of previously output recommendation information.

(3) The server according to (1) or (2), wherein said outputting is external to the server, to a client-side device.

(4) The server according to any one of (1), (2) or (3), wherein the determined information search degree is based on a plurality of different information search viewpoints.

(5) The server according to any one of (1) to (4), wherein the data regarding the recommendation information includes data to reproduce one or more of text information, motion picture information, image information, and sound information.

(6) The server according to any one of (1) to (5), wherein the data regarding the information search degree and the data regarding the recommendation information are output at a same time.

(7) The server according to any one of (1) to (6), wherein the determined information search degree includes a plurality of different calculated information search degrees, and wherein the recommendation information includes a plurality of recommendation information portions corresponding to different recommendation information items.

(8) The server according to any one of (1) to (7), wherein the determined information search degree includes a plurality of determined information search degrees, each of the determined information search degrees having an information search viewpoint different from any other of the determined information search degrees.

(9) The server according to any one of (1) to (8), wherein the determined information search degree includes one or more of a plurality of different kinds of information search viewpoints, including an information search breadth viewpoint, an information search depth viewpoint, an information search newness viewpoint, or an information search popularity viewpoint.

(10) The server according to any one of (1) to (9), wherein the determined information search degree includes one or more of a plurality of different kinds of information search viewpoints, the one or more of the plurality of different kinds of information search viewpoints being selectable by a user.

(11) The server according to any one of (1) to (10), wherein the recommendation information is representative of one or a plurality of searched articles.

(12) The server according to any one of (1) to (11), wherein the determined information search degree denotes a tendency of an information search of previously output recommendation information, and wherein the tendency of the information search is based on prior feedback from a user.

(13) The server according to (12), wherein the prior feedback from the user is positive feedback.

(14) The server according to (12) or (13), wherein the prior feedback from the user includes one or more of a positive evaluation of prior recommendation information and selection of the prior recommendation information.

(15) The server according to any one of (1) to (14), wherein the determined information search degree is based on one or more of a plurality of different kinds of information search viewpoints, at least one of the information search viewpoints being orthogonal to another of the information search viewpoints.

(16) The server according to any one of (1) to (15), wherein the server transmits the data regarding the recommendation information to a client-side device via a network.

(17) The server according to any one of (1) to (16), wherein the circuitry is configured to update recommendation information for outputting the data regarding the recommended information.

(18) The server according to any one of (1) to (17), wherein the updating is based on one or more of user feedback regarding previous recommended information associated with previously output data regarding the recommended information and newly obtained candidate information to output as recommended information.

(19) The server according to any one of (1) to (18), wherein the circuitry is configured to filter candidate information to provide as recommended information, the filtering including filtering out any problematic portions of the candidate information and being performed prior to the circuitry outputting the data regarding the recommendation information.

(20) One or more embodiments according to the present disclosure can include a non-transitory computer-readable storage medium storing computer-readable instructions that, when executed by a computer, cause the computer to perform a method comprising: collecting a plurality of pieces of information via the Internet; determining recommendation information from the collected pieces of information; determining an information search degree associated with the recommendation information; and outputting data regarding the recommendation information and data regarding the information search degree to provide an indication of the recommendation information.

(21) One or more embodiments according to the present disclosure can include a non-transitory computer-readable storage medium storing computer-readable instructions that, when executed by a computer, cause the computer to perform a method comprising: determining an information search degree associated with recommendation information; and outputting data regarding the recommended information.

(22) The non-transitory computer-readable storage medium according to (20) or (21), wherein the determined information search degree denotes a tendency of an information search of previously output recommended information.

(23) The non-transitory computer-readable storage medium according to any one of (20) to (22), wherein the method further comprises: outputting data regarding the determined information search degree.

(24) The non-transitory computer-readable storage medium according to any one of (20) to (23), wherein said determining the information search degree is based on a plurality of different information search viewpoints.

(25) The non-transitory computer-readable storage medium according to any one of (20) to (24), wherein the data regarding the recommended information includes data to reproduce one or more of text information, motion picture information, image information, and sound information.

(26) The non-transitory computer-readable storage medium according to any one of (20) to (25), wherein the method further comprises: outputting data regarding the determined information search degree, wherein said outputting the data regarding the recommended information and said outputting the data regarding the determined information search degree are performed so as to provide at substantially a same time the data regarding the determined information search degree and the data regarding the recommended information.

(27) The non-transitory computer-readable storage medium according to any one of (20) to (26), wherein the determined information search degree includes a plurality of different determined information search degrees, and wherein the recommended information includes a plurality of recommended information portions corresponding to different recommended information items.

(28) The non-transitory computer-readable storage medium according to any one of (20) to (27), wherein the determined information search degree includes a plurality of determined information search degrees, each of the determined information search degrees having an information search viewpoint different from any other of the determined information search degrees.

(29) The non-transitory computer-readable storage medium according to any one of (20) to (28), wherein the determined information search degree includes one or more of a plurality of different kinds of information search viewpoints, including an information search breadth viewpoint, an information search depth viewpoint, an information search newness viewpoint, or an information search popularity viewpoint.

(30) The non-transitory computer-readable storage medium according to any one of (20) to (29), wherein the determined information search degree includes one or more of a plurality of different kinds of information search viewpoints, the one or more of the plurality of different kinds of information search viewpoints being selectable by a user.

(31) The non-transitory computer-readable storage medium according to any one of (20) to (30), wherein the recommended information is representative of one or a plurality of searched articles.

(32) The non-transitory computer-readable storage medium according to any one of (20) to (31), wherein the information search degree denotes a tendency of an information search of previously provided recommended information, and wherein the tendency of the information search is based on prior feedback from a user.

(33) The non-transitory computer-readable storage medium according to (32), wherein the prior feedback from the user is positive feedback.

(34) The non-transitory computer-readable storage medium according to (32) or (33), wherein the prior feedback from the user includes one or more of a positive evaluation of prior recommendation information and selection of the prior recommendation information.

(35) The non-transitory computer-readable storage medium according to any one of (20) to (34), wherein the determined information search degree is based on one or more of a plurality of different kinds of information search viewpoints, at least one of the information search viewpoints being orthogonal to another of the information search viewpoints.

(36) The non-transitory computer-readable storage medium according to any one of (20) to (35), wherein said outputting the data regarding the recommended information is from a server to a client-side device.

(37) The non-transitory computer-readable storage medium according to any one of (20) to (36), wherein the method further comprises: updating recommendation information for said outputting data regarding the recommended information.

(38) The non-transitory computer-readable storage medium according to (37), wherein said updating is based on one or more of user feedback regarding previously output recommended information associated with previously output data regarding the recommended information and newly obtained candidate information to output as recommended information.

(39) The non-transitory computer-readable storage medium according to any one of (20) to (38), wherein the method further comprises: prior to said outputting the data regarding the recommended information, filtering candidate information to provide as recommended information, said filtering including filtering out any problematic portions of the candidate information.

(40) One or more embodiments of the present disclosure also can include an apparatus configured to control display of recommended information comprising: circuitry configured to receive, from a source external to the apparatus, data regarding recommended information, receive, from the source external to the apparatus, data regarding a generated information search degree associated with the recommended information, and control display of an indication of the recommended information based on the received data regarding the generated information search degree and the received data regarding the recommended information.

(41) The apparatus according to (40), wherein the information search degree denotes a tendency of an information search of previously provided recommended information.

(42) The apparatus according to (40) or (41), wherein the recommendation information includes one or more of text information, motion picture information, image information, and sound information.

(43) The apparatus according to any one of (40) to (42), wherein the circuitry is configured to cause display of an indication of the generated information search degree.

(44) The apparatus according to (43), wherein the indication of the recommended information is displayed at a same time as the indication of the generated information search degree.

(45) The apparatus according to (43) or (44), wherein the indication of the generated information search degree includes a plurality of indication portions corresponding to respective different determined information search degrees, wherein the indication of the recommended information includes a plurality of indication portions corresponding to respective different recommended information items, and wherein each of the indication portions corresponding to the respective different determined information search degrees is displayed in correspondence with one of the different recommended information items.

(46) The apparatus according to any one of (40) to (45), wherein the generated information search degree includes a plurality of generated information search degrees, each of the generated information search degrees having an information search viewpoint different from any other of the information search degrees.

(47) The apparatus according to any one of (40) to (46), wherein the generated information search degree includes one or more of a plurality of different kinds of information search viewpoints, including an information search breadth viewpoint, an information search depth viewpoint, an information search newness viewpoint, or an information search popularity viewpoint.

(48) The apparatus according to any one of (40) to (47), wherein the generated information search degree includes one or more of a plurality of different kinds of information search viewpoints, the one or more of the plurality of different kinds of information search viewpoints being selectable by a user.

(49) The apparatus according to any one of (40) to (48), wherein the indication of the recommended information is representative of one or a plurality of searched articles.

(50) The apparatus according to any one of (40) to (49), wherein the information search degree denotes a tendency of an information search of previously provided recommended information, and wherein the tendency of the information search is based on prior feedback from a user received at the apparatus and transmitted to outside the apparatus.

(51) The apparatus according to (50), wherein the prior feedback from the user is positive feedback.

(52) The apparatus according to (50) or (51), wherein the prior feedback from the user includes one or more of a positive evaluation of prior recommendation information and selecting the prior recommendation information.

(53) The apparatus according to any one of (40) to (52), wherein the apparatus is an information terminal.

(54) The apparatus according to (53), wherein the information terminal is one of a smart phone, a tablet, a mobile phone, a notebook personal computer, a desktop personal computer, a game machine, a motion picture reproducing device, and a music reproducing device.

(55) The apparatus according to any one of (40) to (54), wherein the circuitry is configured to control the display of the indication of the recommended information based on execution of a search-recommendation service application operating on the apparatus.

(56) The apparatus according to any one of (40) to (55), wherein the circuitry is configured to control display of an indication of the generated information search degree, the display of the indication of the recommended information being on a first part of a display and the display of the indication of the generated information search degree being displayed on a second part of the display different from the first part.

(57) The apparatus according to any one of (40) to (56), wherein the generated information search degree is based on one or more of a plurality of different kinds of information search viewpoints, at least one of the information search viewpoints being orthogonal to another of the information search viewpoints.

(58) According to the present disclosure, one or more embodiments can include a method for displaying recommendation information comprising: receiving, using a processor, data regarding recommended information, receiving, using the processor, data regarding a calculated information search degree associated with the recommendation information, and displaying, using the processor, an indication of the recommended information based on the received data regarding the calculated information search degree and the received data regarding the recommendation information.

(59) The method according to (58), wherein the information search degree denotes a tendency of an information search of previously provided recommended information.

(60) The method according to (58) or (59), wherein the recommendation information includes one or more of text information, motion picture information, image information, and sound information.

(61) The method according to any one of (58) to (60), further comprising: displaying of an indication of the calculated information search degree.

(62) The method according to (61), wherein said displaying the indication of the recommended information is performed at a same time as said displaying the calculated information search degree.

(63) The method according to any one of (58) to (62), wherein the indication of the calculated information search degree includes a plurality of indication portions corresponding to respective different calculated information search degrees, wherein the indication of the recommended information includes a plurality of indication portions corresponding to respective different recommended information items, and wherein each of the indication portions corresponding to the respective different calculated information search degrees is displayed in correspondence with one of the different recommended information items.

(64) The method according to any one of (58) to (63), wherein the calculated information search degree includes a plurality of calculated information search degrees, each of the calculated information search degrees having an information search viewpoint different from any other of the calculated information search degrees.

(65) The method according to any one of (58) to (64), wherein the calculated information search degree includes one or more of a plurality of different kinds of information search viewpoints, including an information search breadth viewpoint, an information search depth viewpoint, an information search newness viewpoint, or an information search popularity viewpoint.

(66) The method according to any one of (58) to (65), wherein the calculated information search degree includes one or more of a plurality of different kinds of information search viewpoints, the one or more of the plurality of different kinds of information search viewpoints being selectable by a user.

(67) The method according to any one of (58) to (66), wherein the indication of the recommended information is representative of one or a plurality of searched articles.

(68) The method according to any one of (58) to (67), wherein the information search degree denotes a tendency of an information search of previously provided recommended information, and wherein the tendency of the information search is based on prior feedback from a user.

(69) The method according to (68), wherein the prior feedback from the user is positive feedback.

(70) The method according to (68) or (69), wherein the prior feedback from the user includes one or more of a positive evaluation of prior recommendation information and selection of the prior recommendation information.

(71) The method according to any one of (58) to (70), wherein the processor is part of an information terminal.

(72) The method according to (71), wherein the information terminal is one of a smart phone, a tablet, a mobile phone, a notebook personal computer, a desktop personal computer, a game machine, a motion picture reproducing device, and a music reproducing device.

(73) The method according to any one of (58) to (72), wherein said displaying the indication of the recommended information is based on execution of a search-recommendation service application.

(74) The method according to any one of (58) to (73), further comprising: displaying an indication of the calculated information search degree, said displaying of the indication of the recommended information being on a first part of a display and said displaying of the indication of the calculated information search degree being displayed on a second part of the display different from the first part.

(75) The method according to any one of (58) to (74), wherein the calculated information search degree is based on one or more of a plurality of different kinds of information search viewpoints, at least one of the information search viewpoints being orthogonal to another of the information search viewpoints.

(76) One or more embodiments of the present disclosure can also include a method for providing recommendation information comprising: determining, using a processor, an information search degree associated with recommendation information; and providing, using the processor, data regarding the recommended information.

(77) The method according to (76), wherein the determined information search degree denotes a tendency of an information search of previously provided recommended information.

(78) The method according to (76) or (77), further comprising: providing, using the processor, data regarding the determined information search degree.

(79) The method according to any one of (76) to (78), wherein said determining the information search degree is based on a plurality of different information search viewpoints.

(80) The method according to any one of (76) to (79), wherein the data regarding the recommended information includes data to reproduce one or more of text information, motion picture information, image information, and sound information.

(81) The method according to any one of (76) to (80), further comprising: providing, using the processor, data regarding the determined information search degree, wherein said providing the data regarding the recommended information and said providing the data regarding the determined information search degree are performed so as to provide at substantially a same time the data regarding the determined information search degree and the data regarding the recommended information.

(82) The method according to any one of (76) to (81), wherein the determined information search degree includes a plurality of different determined information search degrees, and wherein the recommended information includes a plurality of recommended information portions corresponding to different recommended information items.

(83) The method according to any one of (76) to (82), wherein the determined information search degree includes a plurality of determined information search degrees, each of the determined information search degrees having an information search viewpoint different from any other of the determined information search degrees.

(84) The method according to any one of (76) to (83), wherein the determined information search degree includes one or more of a plurality of different kinds of information search viewpoints, including an information search breadth viewpoint, an information search depth viewpoint, an information search newness viewpoint, or an information search popularity viewpoint.

(85) The method according to any one of (76) to (84), wherein the determined information search degree includes one or more of a plurality of different kinds of information search viewpoints, the one or more of the plurality of different kinds of information search viewpoints being selectable by a user.

(86) The method according to any one of (76) to (85), wherein the recommended information is representative of one or a plurality of searched articles.

(87) The method according to any one of (76) to (86), wherein the information search degree denotes a tendency of an information search of previously provided recommended information, and wherein the tendency of the information search is based on prior feedback from a user.

(88) The method according to (87), wherein the prior feedback from the user is positive feedback.

(89) The method according to (87) or (88), wherein the prior feedback from the user includes one or more of a positive evaluation of prior recommendation information and selection of the prior recommendation information.

(90) The method according to any one of (76) to (89), wherein the determined information search degree is based on one or more of a plurality of different kinds of information search viewpoints, at least one of the information search viewpoints being orthogonal to another of the information search viewpoints.

(91) The method according to any one of (76) to (90), wherein said providing the data regarding the recommended information is from a server to a client-side device.

(92) The method according to any one of (76) to (91), further comprising: updating, using the processor, recommendation information for said providing data regarding the recommended information.

(93) The method according to (92), wherein said updating is based on one or more of user feedback regarding previously provided recommended information associated with previously provided data regarding the recommended information and newly obtained candidate information to provide as recommended information.

(94) The method according to any one of (76) to (93), wherein the processor is in a server.

(95) The method according to any one of (76) to (94), further comprising: prior to said providing the data regarding the recommended information, filtering, using the processor, candidate information to provide as recommended information, said filtering including filtering out any problematic portions of the candidate information.

(96) An information processing device which includes a selection unit which selects a presentation target as a target which is presented to a user in each viewpoint of two or more based on a distribution of a response target which is the target to which a user shows a predetermined response among targets which are presented to the user, when a predetermined target is presented to the user; and a presentation control unit which controls a presentation of the presentation target.

(97) The image processing device which is described in (96), in which the presentation control unit performs a control so the presentation target is individually presented in each of the viewpoints.

(98) The image processing device which is described in (96) or (97), in which the presentation control unit perform a control so that the presentation target selected using the viewpoint which is designated by the user is presented.

(99) The image processing device which is described in any one of (96) to (98), in which the presentation control unit further performs a control so that a value which is obtained by analyzing a distribution of the response target using the viewpoint is presented.

(100) The image processing device which is described in any one of (96) to (99), in which the selection unit selects the presentation target in each of viewpoints of at least two or more of a first viewpoint based on breadth of a range of cluster to which the response target belongs, a second viewpoint based on a distribution in each of the clusters of the response target, a third viewpoint based on a distribution based on newness of the response target, and a fourth viewpoint based on a distribution based on popularity of the response target.

(101) The image processing device which is described in (100), in which the selection unit selects the presentation target from the cluster of which an amount of the response target in the cluster is less than a predetermined threshold value, when the presentation target is selected using the first viewpoint.

(102) The image processing device which is described in (100) or (101), in which the selection unit selects the presentation target from the cluster to which the response target for which the user previously shows a response belongs, when the presentation target is selected using the second viewpoint.

(103) The image processing device which is described in (100) or (101), in which the selection unit selects the presentation target from the cluster of which an amount of the response target in the cluster is a predetermined threshold value or more, when the presentation target is selected using the second viewpoint.

(104) The image processing device which is described in any one of (100) to (103), in which the selection unit selects the presentation target from among the targets which are added or updated in the previous predetermined period of time, when the presentation target is selected using the third viewpoint.

(105) The image processing device which is described in any one of (100) to (104), in which the selection unit selects the presentation target from among the targets of which the popularity is a predetermined threshold value or more, when the presentation target is selected using the fourth viewpoint.

(106) The image processing device which is described in any one of (96) to (105) further includes a clustering unit which performs clustering of the target based on a result of a language analysis of text information, when the target includes the text information.

(107) The image processing device which is described in (106), in which the clustering unit classifies the target into two or more subjectivity types based on subjectivity of the text information.

(108) The image processing device which is described in (107), in which the presentation control unit performs a control so that the presentation target of the subjectivity type which is designated by the user is presented.

(109) The image processing device which is described in (107) or (108), in which the presentation control unit performs a control so that the presentation target of the subjectivity type which is designated by the user is presented.

(110) The image processing device which is described in any one of (107) to (109), in which the selection unit selects the presentation target using a fifth viewpoint based on a distribution based on the subjectivity type of the response target.

(111) The image processing device which is described in any one of (96) to (110), further includes a learning unit which learns a preference of the user with respect to the target in each of the viewpoints, in which the selection unit selects the presentation target using a learned result which is different in each of the viewpoints.

(112) The image processing device which is described in any one of (96) to (110), further includes the learning unit which learns a preference of the user with respect to each of the viewpoints, and the selection unit preferentially uses the viewpoint for which the user shows a strong preference when selecting information which will be presented to the user.

(113) The image processing device which is described in any one of (96) to (112), in which the target is set to the response target to which the user shows a positive response.

(114) An image processing method which includes selecting a presentation target as a target which is presented to a user in each of viewpoints of two or more based on a distribution of a response target which is a target to which a user shows a predetermined response among the targets which are presented to the user, when a predetermined target is presented to the user; and controlling a presentation of the presentation target.

(115) A program which causes a computer to execute processes including selecting a presentation target as a target which is presented to a user in each of viewpoints of two or more based on a distribution of a response target which is a target to which a user shows a predetermined response among targets which are presented to the user, when a predetermined target is presented to the user; and controlling a presentation of the presentation target.

It should be understood by those skilled in the art that various modifications, combinations, sub-combinations, and alterations may occur depending on design requirements and other factors insofar as they are within the scope of the appended claims or the equivalents thereof.

REFERENCE SIGNS LIST

1 Information processing system
11 Server
12 Client
101 Information obtaining unit
102 Clustering unit
103 Presentation information generation unit
111 Information collection module
112 Information editing module
113 Language analysis module
114 Topic analysis module
115 Information search degree calculation module
116 Information search-recommendation module
117 Information integration module
122 Information collection unit
132 Information editing unit
141 Language analysis unit
151 Topic analysis unit
161 Information search degree calculation unit
171 Information searching unit
172 Information recommendation unit
173 Learning unit
181 Managing unit
182 Information presentation control unit
183 User operation information obtaining unit
201 Information reading module
212 Control unit
301 Screen
311a to 314c Thumbnail
331 Screen
342a to 342e Degree of information search display unit
343a to 343d recommended information display unit
361 Screen

The invention claimed is:

1. A server comprising:
circuitry configured to
collect a plurality of pieces of information via the Internet,
determine recommendation information from the collected pieces of information,
determine a plurality of information search degrees associated with the recommendation information, the determined plurality of information search degrees being based on a plurality of different information search viewpoints by a user, and
output, to the user, data regarding the recommendation information and data regarding the plurality of information search degrees to provide an indication of the recommendation information such that (1) a first information search degree of the user regarding a first information search view point of the user is outputted together with a first link to first recommendation information, which when accessed by the user will increase the first information search degree, and that (2) a second information search degree of the user regarding a second information search view point of the user is outputted together with a second link to second recommendation information, which when accessed by the user will increase the second information search degree, to indicate to the user what information the user is recommended to access to increase each degree of the plurality of information search degrees respectively.

2. The server according to claim 1, wherein each of the determined information search degrees denotes a tendency of an information search of previously output recommendation information.

3. The server according to claim 1, wherein said outputting is external to the server, to a client-side device.

4. The server according to claim 1, wherein the data regarding the recommendation information includes data to reproduce one or more of text information, motion picture information, image information, and sound information.

5. The server according to claim 1, wherein the plurality of different information search viewpoints include at least one of an information search breadth viewpoint, an information search depth viewpoint, an information search newness viewpoint, and an information search popularity viewpoint.

6. The server according to claim 1, wherein the plurality of different information search viewpoints are selectable by a user.

7. The server according to claim 1, wherein the recommendation information is representative of one or a plurality of searched articles.

8. The server according to claim 1,
wherein each of the determined information search degrees denotes a tendency of an information search of previously output recommendation information, and
wherein the tendency of the information search is based on prior feedback from a user.

9. The server according to claim 8, wherein the prior feedback from the user is positive feedback.

10. The server according to claim 8, wherein the prior feedback from the user includes one or more of a positive evaluation of prior recommendation information and selection of the prior recommendation information.

11. The server according to claim 1, wherein at least one of the different information search viewpoints is orthogonal to another of the different information search viewpoints.

12. The server according to claim 1, wherein the server transmits the data regarding the recommendation information to a client-side device via a network.

13. The server according to claim 1, wherein the circuitry is configured to update recommendation information for outputting the data regarding the recommended information.

14. The server according to claim 13, wherein the updating is based on one or more of user feedback regarding previous recommended information associated with previously output data regarding the recommended information and newly obtained candidate information to output as recommended information.

15. The server according to claim 1, wherein the circuitry is configured to filter candidate information to provide as recommended information, the filtering including filtering out any problematic portions of the candidate information and being performed prior to the circuitry outputting the data regarding the recommendation information.

16. The server according to claim 1, wherein the plurality of different information search viewpoints include at least two of an information search breadth viewpoint, an information search depth viewpoint, an information search newness viewpoint, and an information search popularity viewpoint.

17. A non-transitory computer-readable storage medium storing computer-readable instructions that, when executed by a computer, cause the computer to perform a method comprising:
   collecting a plurality of pieces of information via the Internet;
   determining recommendation information from the collected pieces of information;
   determining a plurality of information search degrees associated with the recommendation information, the determined plurality of information search degrees being based on a plurality of different information search viewpoints by a user; and
   outputting, to the user, data regarding the recommendation information and data regarding the plurality of information search degrees to provide an indication of the recommendation information such that (1) a first information search degree of the user regarding a first information search view point of the user is outputted together with a first link to first recommendation information, which when accessed by the user will increase the first information search degree, and that (2) a second information search degree of the user regarding a second information search view point of the user is outputted together with a second link to second recommendation information, which when accessed by the user will increase the second information search degree, to indicate to the user what information the user is recommended to access to increase each degree of the plurality of information search degrees respectively.

18. An apparatus configured to control display of recommended information, the apparatus comprising:
   circuitry configured to
   receive, from a source external to the apparatus, data regarding recommended information,
   receive, from the source external to the apparatus, data regarding a plurality of generated information search degrees associated with the recommended information, the plurality of generated information search degrees being based on a plurality of different information search viewpoints by a user, and
   control display of an indication of the recommended information based on the received data regarding the generated information search degree and the received data regarding the recommended information such that (1) a first information search degree of the user regarding a first information search view point of the user is displayed together with a first link to first recommendation information, which when accessed by the user will increase the first information search degree, and that (2) a second information search degree of the user regarding a second information search view point of the user is displayed together with a second link to second recommendation information, which when accessed by the user will increase the second information search degree, to indicate to the user what information the user is recommended to access to increase each degree of the plurality of information search degrees respectively.

* * * * *